(12) United States Patent
Iwasawa et al.

(10) Patent No.: US 7,408,583 B2
(45) Date of Patent: Aug. 5, 2008

(54) TAKING LENS APPARATUS

(75) Inventors: Yoshito Iwasawa, Setagaya-ku (JP);
Takashi Okada, Osaka (JP); Tetsuo Kohno, Suita (JP)

(73) Assignee: Konica Minolta Camera, Inc., Sakai-Shi (JP)

( * ) Notice: Subject to any disclaimer, the term of this patent is extended or adjusted under 35 U.S.C. 154(b) by 959 days.

(21) Appl. No.: 10/611,016

(22) Filed: Jul. 1, 2003

(65) Prior Publication Data
US 2004/0080632 A1    Apr. 29, 2004

(30) Foreign Application Priority Data
Jul. 5, 2002    (JP)    ............... 2002-196799

(51) Int. Cl.
*H04N 5/225*    (2006.01)
*H04N 5/232*    (2006.01)
*H04N 5/262*    (2006.01)

(52) U.S. Cl. ............ 348/335; 348/345; 348/240.3

(58) Field of Classification Search ............. 348/335, 348/345, 240.3
See application file for complete search history.

(56) References Cited

U.S. PATENT DOCUMENTS

| | | | | |
|---|---|---|---|---|
| 5,448,319 A | * | 9/1995 | Iuzawa | ............ 396/419 |
| 6,104,432 A | * | 8/2000 | Nakamura et al. | ......... 348/360 |

2002/0136150 A1 * 9/2002 Mihara et al. ............... 369/125

FOREIGN PATENT DOCUMENTS

| | | |
|---|---|---|
| EP | 0 906 587 B1 | 9/2002 |
| JP | 08-248318 A | 9/1996 |
| JP | 11-196303 A | 7/1999 |
| JP | 11-258678 A | 9/1999 |
| JP | 2000-131610 A | 5/2000 |

OTHER PUBLICATIONS

U.S. Appl. No. 09/821,532, filed Mar. 28, 2001, Yamamoto et al.
U.S. Appl. No. 10/390,360, filed Mar. 17, 2003, Iwasawa et al.

* cited by examiner

*Primary Examiner*—James M Hannett
(74) *Attorney, Agent, or Firm*—Sidley Austin LLP

(57) ABSTRACT

A taking lens apparatus includes a zoom lens system that is composed of a plurality of lens units and that achieves zooming by varying the distances between the lens units and an image sensor that converts the optical image formed by the zoom lens system into an electrical signal. The zoom lens system has, from the object side,: a first lens unit having a negative optical power, a second lens unit disposed on the image side of the first lens unit and having a negative optical power, a third lens unit disposed on the image side of the second lens unit and having a positive optical power, a fourth lens unit disposed on the image side of the third lens unit and having a positive optical power, and a fifth lens unit disposed on the image side of the fourth lens unit and having a positive optical power. During zooming, the first lens unit remains stationary relative to the image sensor, and the second and third lens units move.

21 Claims, 15 Drawing Sheets

FNO=2.80
(W)
— d
— — g
— — — SC
-0.2    0.2
SPHERICAL  SINE
ABERRATION CONDITION

Y'=2.8
— — — DM
— DS
-0.2    0.2
ASTIGMATISM

Y'=2.8
-5.0    5.0
DISTORTION%

FNO=3.70
(M)
— d
— — g
— — — SC
-0.2    0.2
SPHERICAL  SINE
ABERRATION CONDITION

Y'=2.8
— — — DM
— DS
-0.2    0.2
ASTIGMATISM

Y'=2.8
-5.0    5.0
DISTORTION%

FNO=4.20
(T)
— d
— — g
— — — SC
-0.2    0.2
SPHERICAL  SINE
ABERRATION CONDITION

Y'=2.8
— — — DM
— DS
-0.2    0.2
ASTIGMATISM

Y'=2.8
-5.0    5.0
DISTORTION%

FNO=2.80

(W)

— d
--- g
---- SC

-0.2    0.2
SPHERICAL  SINE
ABERRATION CONDITION

Y'=2.8

---- DM
— DS

-0.2    0.2
ASTIGMATISM

Y'=2.8

-5.0    5.0
DISTORTION%

FNO=3.70

(M)

— d
--- g
---- SC

-0.2    0.2
SPHERICAL  SINE
ABERRATION CONDITION

Y'=2.8

---- DM
— DS

-0.2    0.2
ASTIGMATISM

Y'=2.8

-5.0    5.0
DISTORTION%

FNO=4.70

(T)

— d
--- g
---- SC

-0.2    0.2
SPHERICAL  SINE
ABERRATION CONDITION

Y'=2.8

---- DM
— DS

-0.2    0.2
ASTIGMATISM

Y'=2.8

-5.0    5.0
DISTORTION%

FNO=2.80
(W)
— d
— — g
- - - SC
-0.2    0.2
SPHERICAL SINE
ABERRATION CONDITION

Y'=2.8
- - - DM
— DS
-0.2    0.2
ASTIGMATISM

Y'=2.8
-5.0    5.0
DISTORTION%

FNO=3.70
(M)
— d
— — g
- - - SC
-0.2    0.2
SPHERICAL SINE
ABERRATION CONDITION

Y'=2.8
- - - DM
— DS
-0.2    0.2
ASTIGMATISM

Y'=2.8
-5.0    5.0
DISTORTION%

FNO=4.70
(T)
— d
— — g
- - - SC
-0.2    0.2
SPHERICAL SINE
ABERRATION CONDITION

Y'=2.8
- - - DM
— DS
-0.2    0.2
ASTIGMATISM

Y'=2.8
-5.0    5.0
DISTORTION%

FNO=2.80

(W)

— d
— — g
— — — SC

-0.2　0.2
SPHERICAL SINE
ABERRATION CONDITION

Y'=2.8

— — — DM
——— DS

-0.2　0.2
ASTIGMATISM

Y'=2.8

-5.0　5.0
DISTORTION%

FNO=3.70

(M)

— d
— — g
— — — SC

-0.2　0.2
SPHERICAL SINE
ABERRATION CONDITION

Y'=2.8

— — — DM
——— DS

-0.2　0.2
ASTIGMATISM

Y'=2.8

-5.0　5.0
DISTORTION%

FNO=4.74

(T)

— d
— — g
— — — SC

-0.2　0.2
SPHERICAL SINE
ABERRATION CONDITION

Y'=2.8

— — — DM
——— DS

-0.2　0.2
ASTIGMATISM

Y'=2.8

-5.0　5.0
DISTORTION%

FNO=2.80

(W)

— d
— — g
- - - SC

-0.2   0.2
SPHERICAL  SINE
ABERRATION CONDITION

Y'=2.8

- - - - DM
——— DS

-0.2   0.2
ASTIGMATISM

Y'=2.8

-5.0   5.0
DISTORTION%

FNO=3.70

(M)

— d
— — g
- - - SC

-0.2   0.2
SPHERICAL  SINE
ABERRATION CONDITION

Y'=2.8

- - - - DM
——— DS

-0.2   0.2
ASTIGMATISM

Y'=2.8

-5.0   5.0
DISTORTION%

FNO=4.70

(T)

— d
— — g
- - - SC

-0.2   0.2
SPHERICAL  SINE
ABERRATION CONDITION

Y'=2.8

- - - - DM
——— DS

-0.2   0.2
ASTIGMATISM

Y'=2.8

-5.0   5.0
DISTORTION%

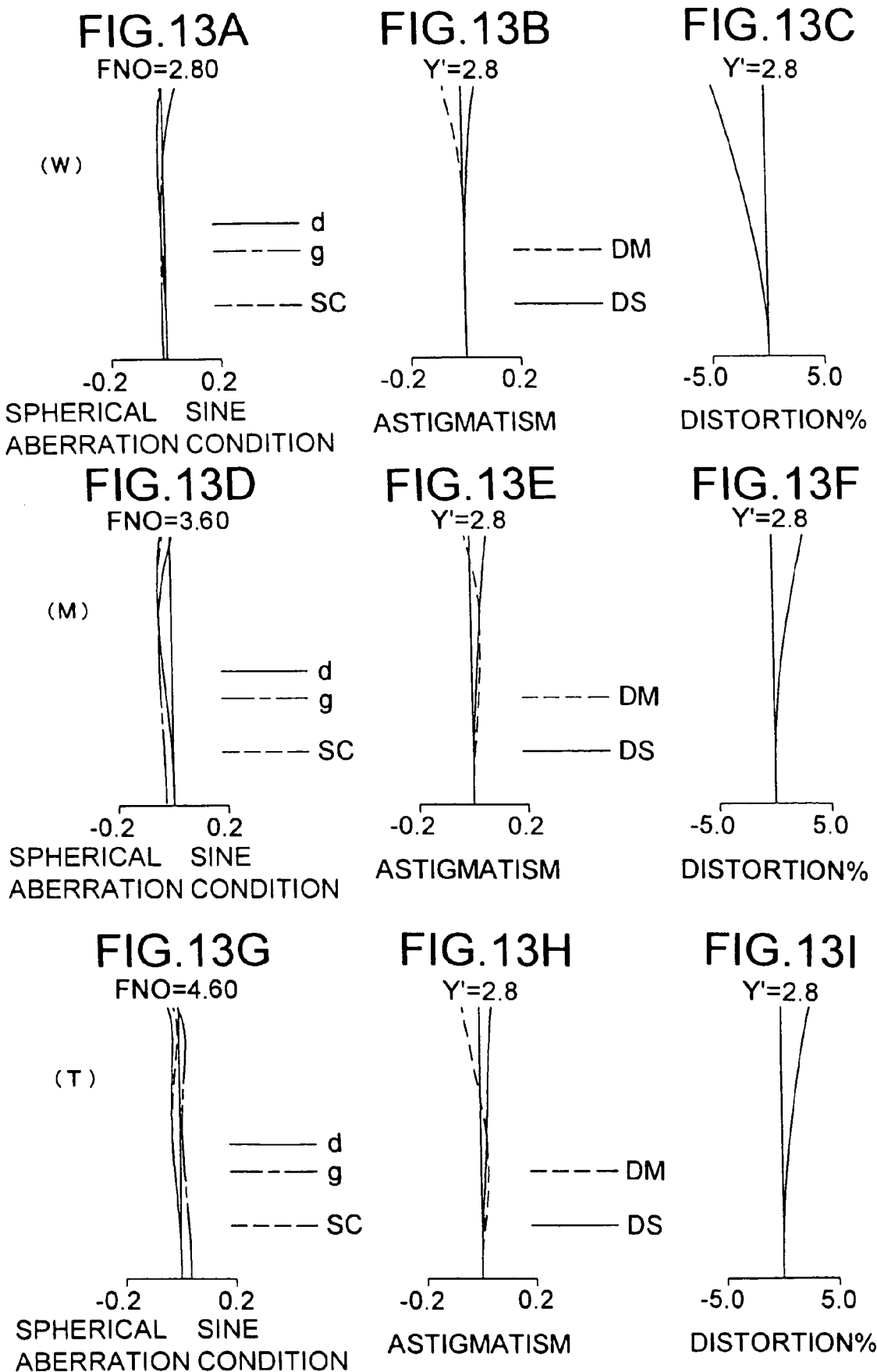

FIG.14A
FNO=2.80
(W)
— d
— — g
— — — SC
-0.2  0.2
SPHERICAL SINE
ABERRATION CONDITION
FIG.14B
Y'=2.8
— — — DM
— DS
-0.2  0.2
ASTIGMATISM
FIG.14C
Y'=2.8
-5.0  5.0
DISTORTION%
FIG.14D
FNO=3.67
(M)
— d
— — g
— — — SC
-0.2  0.2
SPHERICAL SINE
ABERRATION CONDITION
FIG.14E
Y'=2.8
— — — DM
— DS
-0.2  0.2
ASTIGMATISM
FIG.14F
Y'=2.8
-5.0  5.0
DISTORTION%
FIG.14G
FNO=4.30
(T)
— d
— — g
— — — SC
-0.2  0.2
SPHERICAL SINE
ABERRATION CONDITION
FIG.14H
Y'=2.8
— — — DM
— DS
-0.2  0.2
ASTIGMATISM
FIG.14I
Y'=2.8
-5.0  5.0
DISTORTION%
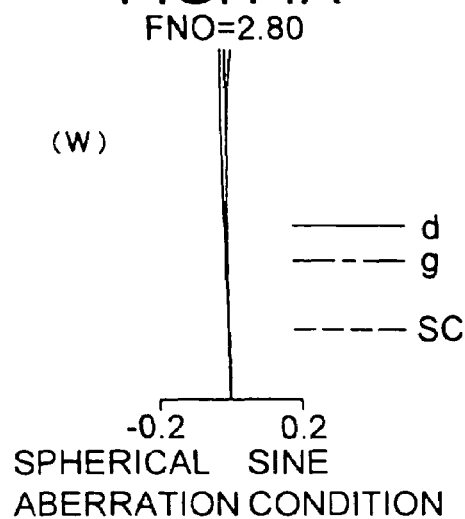
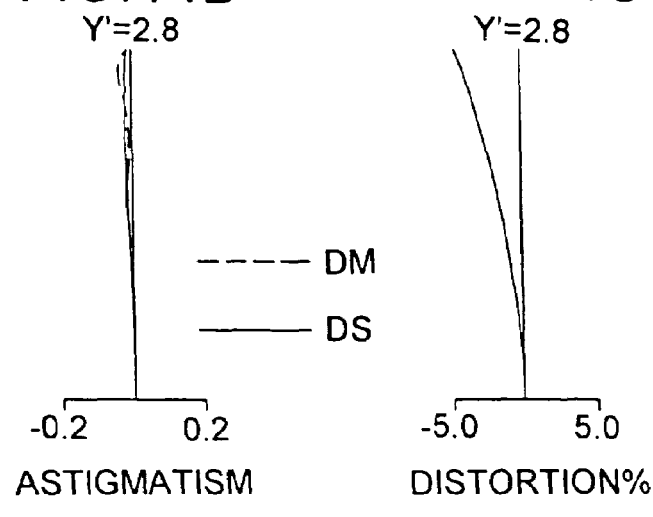
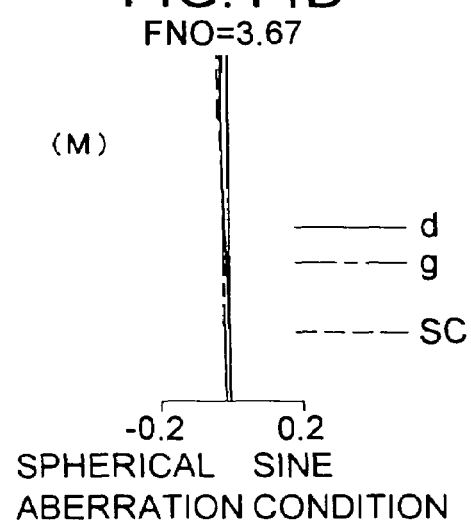
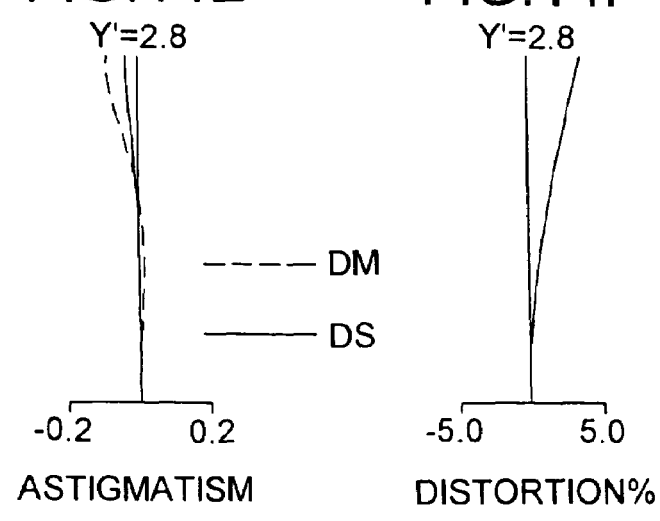
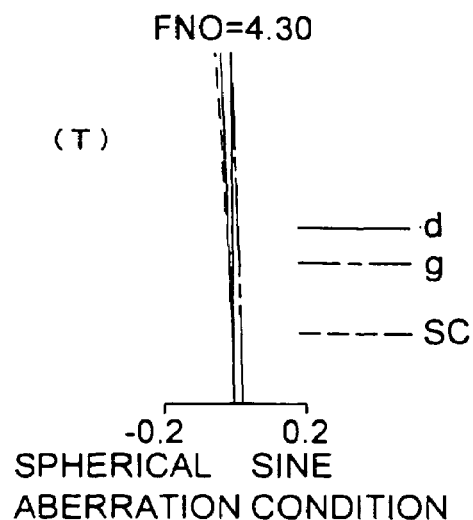
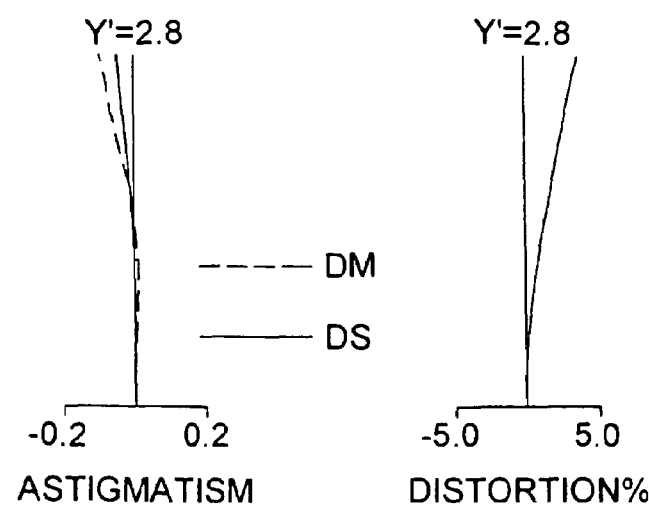

TAKING LENS APPARATUS

This application is based on Japanese Patent Application No. 2002-196799 filed on Jul. 5, 2002, the contents of which are hereby incorporated by reference.

BACKGROUND OF THE INVENTION

1. Field of the Invention

The present invention relates to a taking lens apparatus. More specifically, the present invention relates to a taking lens apparatus (a main component of a digital camera, video camera, or camera incorporated in or externally fitted to a digital video unit, personal computer, mobile computer, cellular phone, personal digital assistant (PDA), or the like) that optically takes in an image of a subject through an optical system and that then outputs it in the form of an electrical signal by means of an image sensor, and in particular to a taking lens apparatus provided with a compact high-zoom-ratio zoom lens system.

2. Description of the Prior Art

In recent years, as personal computers become increasingly wide-spread, digital cameras, which permit easy capturing of images, have been becoming increasingly popular with individual users. Digital cameras are expected to continue becoming more and more popular into the future as an image data input device. The image quality of a digital camera generally depends on the number of pixels on the solid-state image sensor, such as a CCD (charge-coupled device), incorporated therein. Nowadays, digital cameras for general consumers boast of high resolution over one mega pixels, and are closing in on cameras using silver-halide film in image quality. Accordingly, to cope with high resolution of modern image sensors, high optical performance is sought in taking lens systems. On the other hand, in digital cameras for general consumers, zooming, in particular optical zooming with minimal image degradation, is desired.

However, in taking lens systems, it is difficult to achieve high optical performance and a high zoom ratio simultaneously. In addition, in zoom lens systems for use in digital cameras for general consumers, compactness matters. Various proposals have conventionally been made to meet those conflicting requirements. One such proposal is to divert for a digital camera a zoom lens system originally designed for a lens-shutter camera. Another is, as disclosed in Japanese Patent Application Laid-Open No. H8-248318, disposing a prism between lenses to turn the optical axis and thereby shorten the length of the optical system in the direction of the optical axis of the incident light. This helps make a zoom lens system compact.

It is however difficult to meet the aforementioned different requirements simultaneously with conventionally known zoom lens systems. For example, in a lens shutter camera using silver-halide film, the exit pupil of the zoom lens system used therein is located close to the image plane. Thus, using this zoom lens system in a digital camera makes it impossible to fully exploit the light-condensing performance of the microlenses provided in front of the solid-state image sensor, resulting in extremely uneven brightness between a central and a peripheral portion of the image formed. With conventionally proposed zoom lens systems for digital cameras, it is not possible to move their exit pupil away from the image plane without making the zoom lens systems as a whole larger. The zoom lens system disclosed in Japanese Patent Application Laid-Open No. H8-248318 is compact in the direction of the optical axis of the incident light, but its plus-lead zoom type requires a large front lens element and a large reflecting member, resulting in unsatisfactory compactness.

SUMMARY OF THE INVENTION

An object of the present invention is to provide a taking lens apparatus provided with a novel, compact zoom lens system that offers a high zoom ratio and high image quality simultaneously.

To achieve the above object, according to one aspect of the present invention, a taking lens apparatus is provided with: a zoom lens system that is composed of a plurality of lens units and that achieves zooming by varying the distances between the lens units; and an image sensor that converts the optical image formed by the zoom lens system into an electrical signal. The zoom lens system is provided with, from the object side: a first lens unit having a negative optical power; a second lens unit disposed on the image side of the first lens unit and having a negative optical power; a third lens unit disposed on the image side of the second lens unit and having a positive optical power; a fourth lens unit disposed on the image side of the third lens unit and having a positive optical power; and a fifth lens unit disposed on the image side of the fourth lens unit and having a positive optical power. Here, during zooming, the first lens unit remains stationary relative to the image sensor, and the second and third lens units move.

According to another aspect of the present invention, a taking lens apparatus is provided with: a zoom lens system that is composed of a plurality of lens units and that achieves zooming by varying the distances between the lens units; and an image sensor that converts the optical image formed by the zoom lens system into an electrical signal. The zoom lens system is provided with, from the object side: a first lens unit having a negative optical power and including a reflective surface that bends the optical path substantially at 90°; a second lens unit disposed on the image side of the first lens unit and having a negative optical power; and a plurality of succeeding lens units disposed on the image side of the second lens unit, the plurality of succeeding lens units including at least two lens units having a positive optical power.

According to still another aspect of the present invention, a digital camera is provided with a taking lens apparatus as described above.

According to a further aspect of the present invention, a cellular phone is provided with a taking lens apparatus as described above.

BRIEF DESCRIPTION OF THE DRAWINGS

This and other objects and features of the present invention will become clear from the following description, taken in conjunction with the preferred embodiments with reference to the accompanying drawings in which:

FIGS. 13A to 13I are aberration diagrams of Example 6;
FIGS. 14A to 14I are aberration diagrams of Example 7.

DESCRIPTION OF THE PREFERRED EMBODIMENTS

Hereinafter, taking lens apparatuses embodying the present invention will be described with reference to the drawings. A taking lens apparatus takes in an image of a subject optically and outputs it in the form of an electrical signal. A taking lens apparatus is used as a main component of a camera (for example, a digital camera, video camera, or camera incorporated in or externally fitted to a digital video unit, personal computer, mobile computer, cellular phone, personal digital assistant (PDA), or the like) that is used to shoot a still or moving picture of a subject. For example as shown in FIG. 15, a taking lens apparatus 10 incorporated in a camera 20 is composed of, from the object (subject) side thereof, a taking lens system TL for forming an optical image of an object, a parallel-surface plate PL acting as an optical low-pass filter or the like, and an image sensor SR for converting the optical image formed by the taking lens system TL into an electrical signal.

In all the embodiments of the invention described later, a zoom lens system composed of a plurality of lens units is used as the taking lens system TL, and zooming is achieved by moving a plurality of lens units along the optical axis AX in such a way as to vary the distances between them. Used as the image sensor SR is, for example, a solid-state image sensor such as a CCD (charge-coupled device) or a CMOS (complementary metal-oxide semiconductor) sensor composed of a plurality of pixels. The optical image formed by the zoom lens system is converted into an electrical signal by the image sensor SR.

The optical image to be formed by the zoom lens system passes through the optical low-pass filter (i.e., the parallel-surface plate PL) having a predetermined cutoff frequency characteristic that depends on the pixel pitch of the image sensor SR, and meanwhile the optical image has its spatial frequency characteristic so adjusted as to minimize so-called aliasing noise generated when the optical image is converted into an electrical signal. Used as the optical low-pass filter is a birefringence-type low-pass filter made of quartz or the like having an appropriately aligned crystal axis, a phase-type low-pass filter that achieves the required optical cut-off frequency characteristics by exploiting diffraction, or a low-pass filter of any other type. The signal produced by the image sensor SR is subjected to predetermined digital image processing, image compression processing, and the like as required, and is recorded in a memory (such as a semiconductor memory or an optical disk) as a digital video signal; in some cases, the signal is transferred to another device through a cable or after being converted into an infrared signal.

Figure 15:
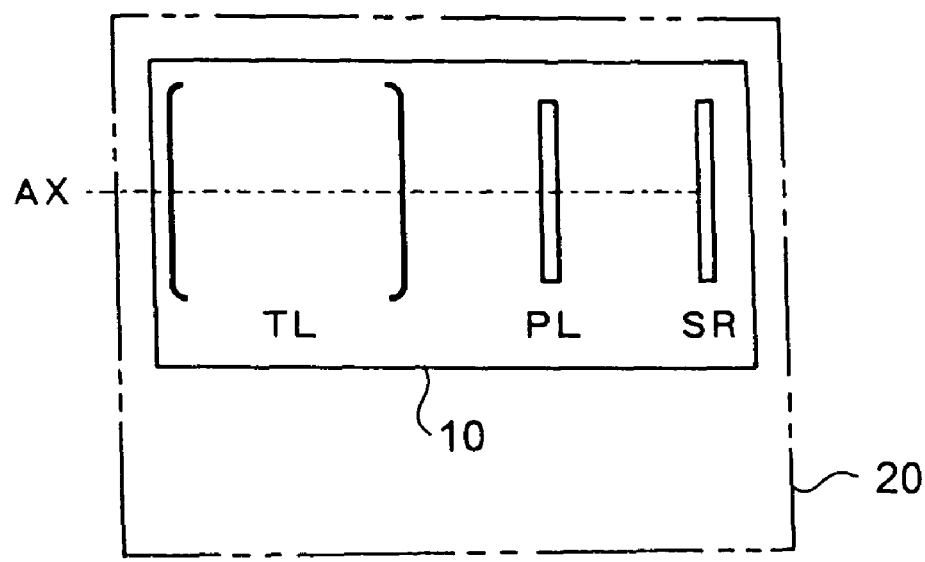
FIG. 15 is a diagram schematically showing an outline of the optical construction of the taking lens apparatus embodying the invention.

In the taking lens apparatus 10 shown in FIG. 15, the taking lens system TL performs reduction-projection from the subject located on the enlargement side (with a longer conjugate distance) to the image sensor SR located on the reduction side (with a shorter conjugate distance). It is, however, also possible to use instead of the image sensor SR a display device (for example, a liquid crystal display device) that displays a two-dimensional image, and use the taking lens system TL as a projection lens system. In this way, it is possible to realize an image projection apparatus that performs enlargement-projection from the image display surface located on the reduction side to a screen surface located on the enlargement side. That is, the zoom lens systems of the embodiments described below can be suitably used not only as a taking lens system TL but also as a projection lens system.

FIGS. 1 to 7 are lens construction diagrams corresponding to the zoom lens systems used respectively in a first to a seventh embodiment of the invention, each showing the lens arrangement as observed at the wide-angle end W in an optical section. In each lens construction diagram, an arrow mj (j=1, 2, . . . ) schematically indicate the movement of the j-th lens unit Grj during zooming from the wide-angle end W to the telephoto end T. In the first to third and fifth to seventh embodiments (FIGS. 1 to 3 and 5 to 7), the first and fifth lens units Gr1 and Gr5 are stationary, and the second to fourth lens units Gr2 to Gr4 are movable; in the fourth embodiment (FIG. 4), the first lens unit Gr1 is stationary, and the second to fifth lens units Gr2 to Gr5 are movable (in FIG. 4, m6 indicates that the parallel-surface plate PL alone is stationary during zooming). Moreover, in each lens construction diagram, a surface marked as ri (i=1, 2, 3, . . . ) is the i-th surface from the object side, with an asterisk (*) following ri indicating an aspherical surface, and an axial distance marked as di (i=1, 2, 3, . . . ) is the i-th axial distance from the object side, through only those axial distances which vary as zooming is performed, i.e., variable axial distances, are shown here.

In all the embodiments, the zoom lens system is composed of, from the object side thereof, a first lens unit Gr1 having a negative optical power, a second lens unit Gr2 having a negative optical power, a third lens unit Gr3 having a positive optical power, a fourth lens unit Gr4 having a positive optical power, and a fifth lens unit Gr5 having a positive optical power. The zoom lens system is built as a five-unit zoom lens system that achieves zooming by varying the distances between its constituent lens units. Between the third and fourth lens units Gr3 and Gr4 is disposed an aperture stop ST that moves together with the fourth lens unit Gr4 during zooming. The zoom lens system is used in a camera 20 (for example, a digital camera) provided with an image sensor SR such as a CCD, and therefore has two glass parallel-surface plates PL disposed on the image side thereof. These parallel-surface plates PL correspond to an optical filter such as an optical low-pass filter and to a cover glass plate of the image sensor SR or the like. In all the embodiments, the parallel-surface plates PL and the first lens unit Gr1 are kept stationary during zooming, and, as described above, in the first to third and fifth to seventh embodiments, the fifth lens unit Gr5 is also kept stationary during zooming. Now, the lens construction of each embodiment will be described in more detail.

Figure 1:
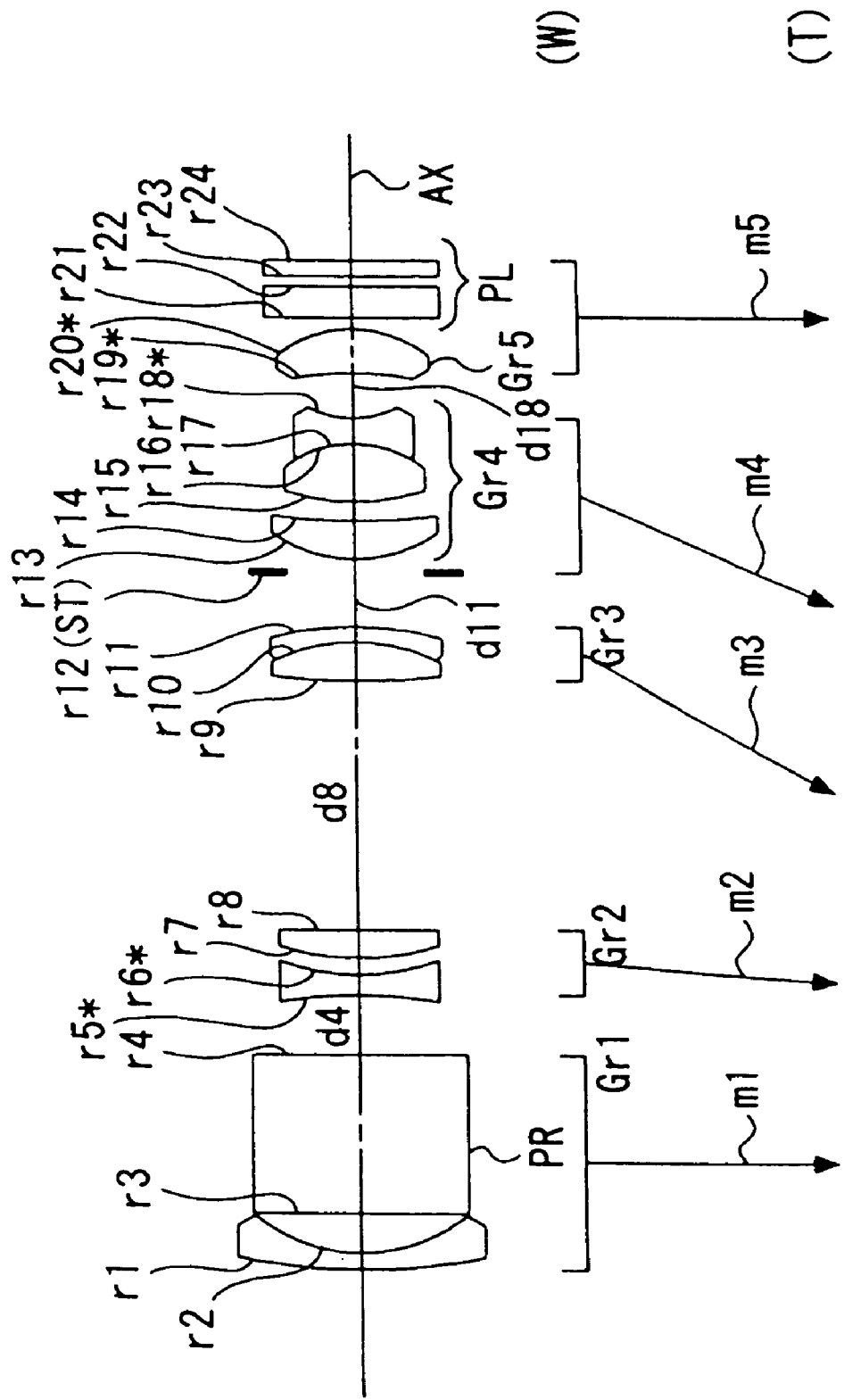
FIG. 1 is a lens construction diagram of a first embodiment (Example 1) of the invention.

First Embodiment FIG. 1

The zoom lens system of a first embodiment of the invention is a five-unit zoom lens system of a negative-negative-positive-positive-positive type, with each lens unit constructed, from the object side thereof, as follows. The first lens unit Gr1 is composed of a negative meniscus lens element convex to the object side and a rectangular prism PR having a reflective surface for bending the optical axis AX at 90°. The second lens unit Gr2 is composed of a biconcave negative lens element (having aspherical surfaces on both sides) and a positive meniscus lens element convex to the object side. The third lens unit Gr3 is composed of a cemented positive lens element produced by cementing together a biconvex positive lens element and a negative meniscus lens element convex to the image side. The fourth lens unit Gr4 is composed of a positive meniscus lens element convex to the object side and a cemented lens element (having an aspherical surface on the image side) produced by cementing together a biconvex positive lens element and a biconcave negative lens element. The fifth lens unit Gr5 is composed solely of a positive meniscus lens element (having aspherical surfaces on both sides) convex to the image side.

Figure 2:
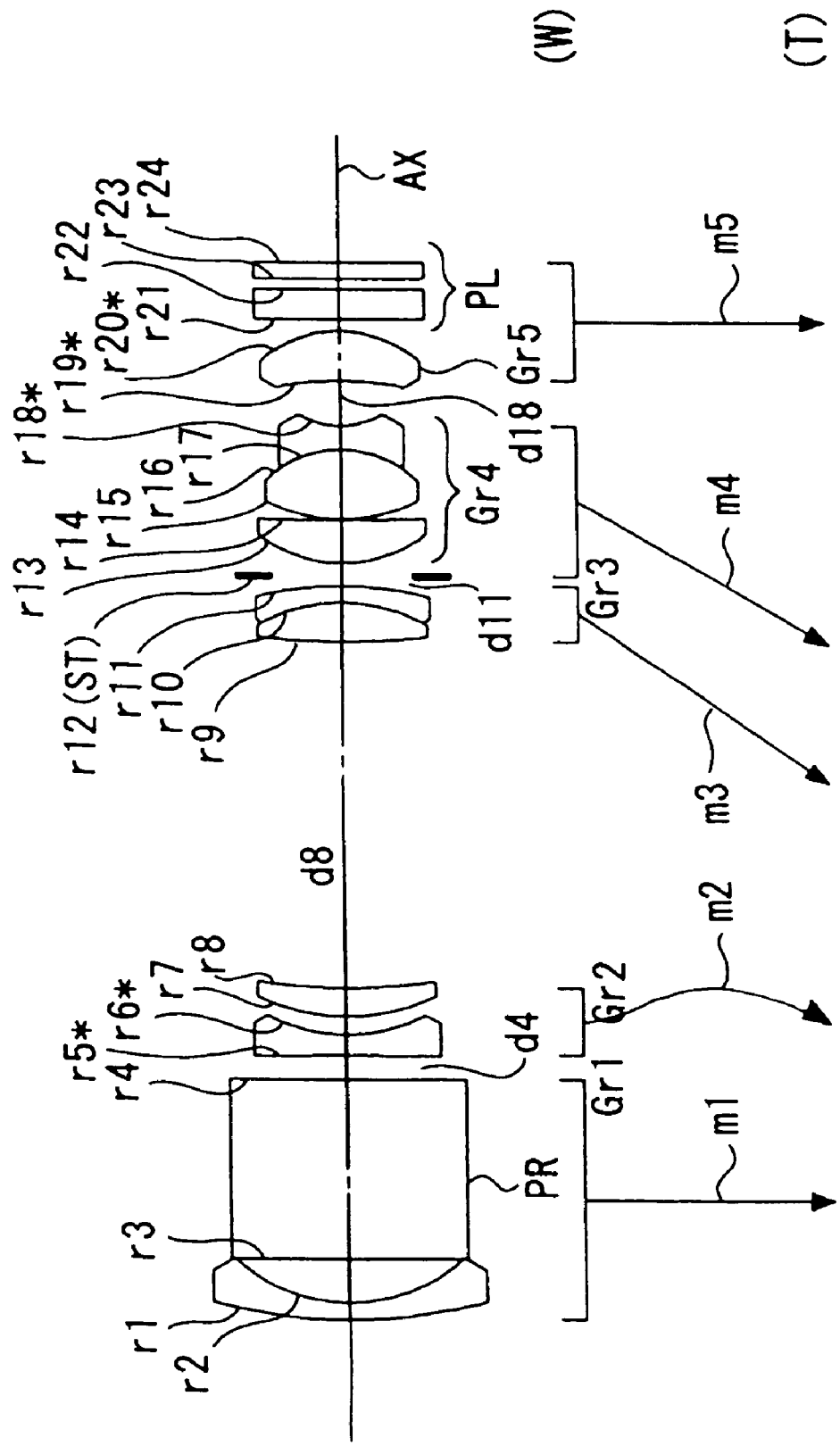
FIG. 2 is a lens construction diagram of a second embodiment (Example 2) of the invention.

Second Embodiment FIG. 2

The zoom lens system of a second embodiment of the invention is a five-unit zoom lens system of a negative-negative-positive-positive-positive type, with each lens unit constructed, from the object side thereof, as follows. The first lens unit Gr1 is composed of a negative meniscus lens element convex to the object side and a rectangular prism PR having a reflective surface for bending the optical axis AX at 90°. The second lens unit Gr2 is composed of a biconcave negative lens element (having aspherical surfaces on both sides) and a positive meniscus lens element convex to the object side. The third lens unit Gr3 is composed of a cemented positive lens element produced by cementing together a biconvex positive lens element and a negative meniscus lens element convex to the image side. The fourth lens unit Gr4 is composed of a positive meniscus lens element convex to the object side and a cemented lens element (having an aspherical surface on the image side) produced by cementing together a biconvex positive lens element and a biconcave negative lens element. The fifth lens unit Gr5 is composed solely of a positive meniscus lens element (having aspherical surfaces on both sides) convex to the image side.

Figure 3:
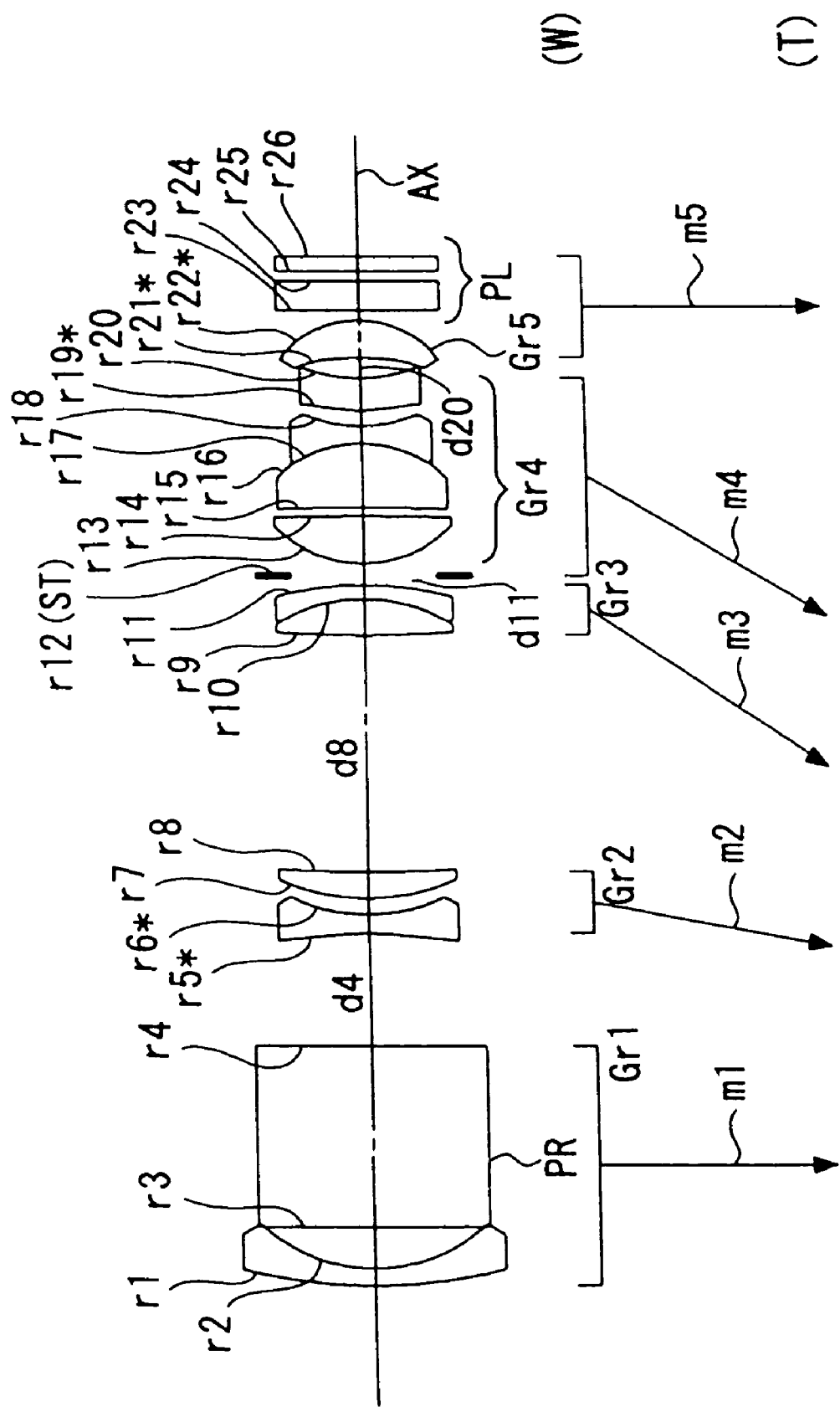
FIG. 3 is a lens construction diagram of a third embodiment (Example 3) of the invention.

Third Embodiment FIG. 3

The zoom lens system of a third embodiment of the invention is a five-unit zoom lens system of a negative-negative-positive-positive-positive type, with each lens unit constructed, from the object side thereof, as follows. The first lens unit Gr1 is composed of a negative meniscus lens element convex to the object side and a rectangular prism PR having a reflective surface for bending the optical axis AX at 90°. The second lens unit Gr2 is composed of a biconcave negative lens element (having aspherical surfaces on both sides) and a positive meniscus lens element convex to the object side. The third lens unit Gr3 is composed of a cemented positive lens element produced by cementing together a biconvex positive lens element and a negative meniscus lens element convex to the image side. The fourth lens unit Gr4 is composed of a biconvex positive lens element, a cemented lens element produced by cementing together a positive meniscus lens element convex to the image side and a biconcave negative lens element, and a negative meniscus lens element (having an aspherical surface on the object side) concave to the image side. The fifth lens unit Gr5 is composed solely of a positive meniscus lens element (having aspherical surfaces on both sides) convex to the image side.

Figure 4:
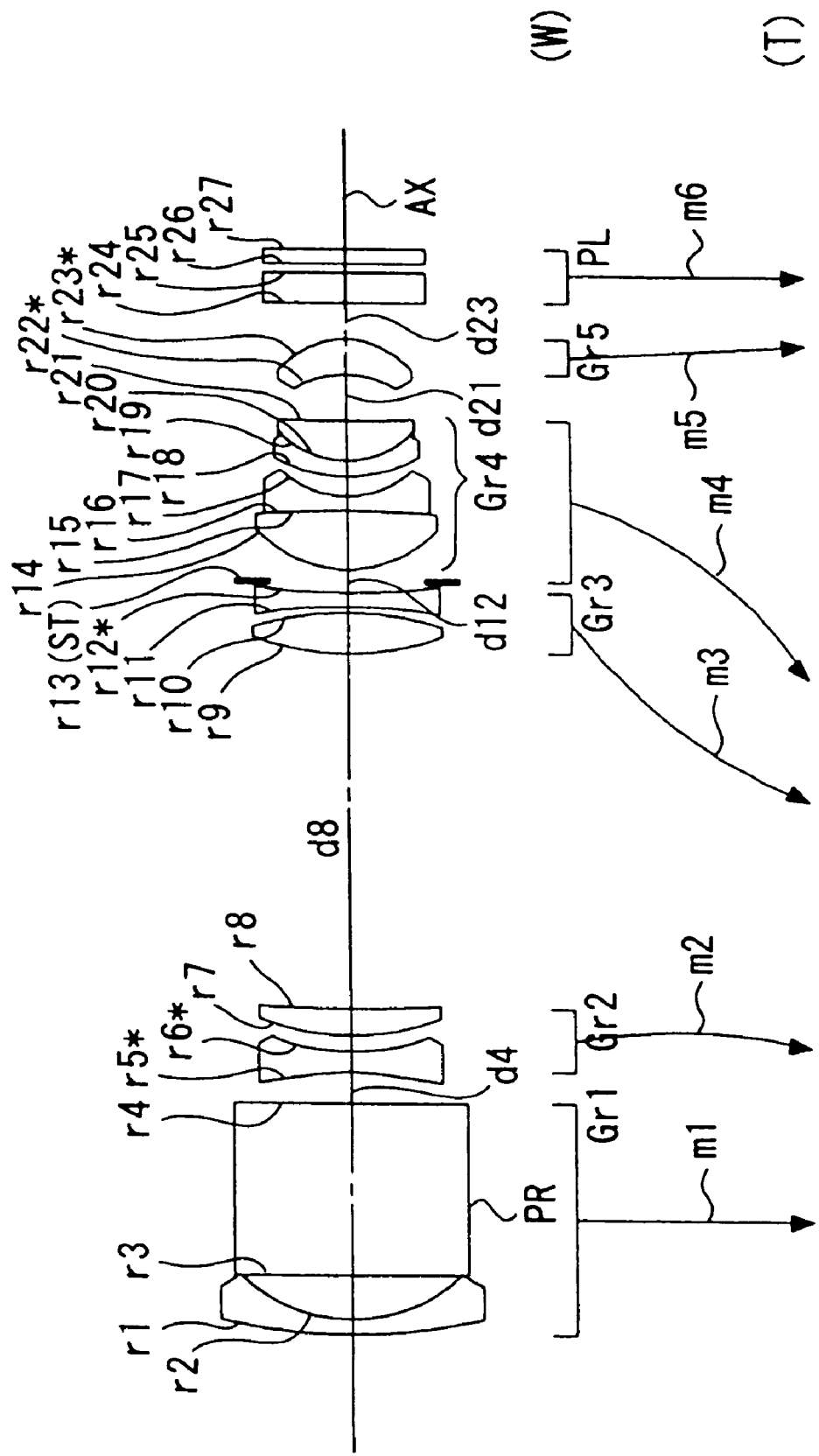
FIG. 4 is a lens construction diagram of a fourth embodiment (Example 4) of the invention.

Fourth Embodiment FIG. 4

The zoom lens system of a fourth embodiment of the invention is a five-unit zoom lens system of a negative-negative-positive-positive-positive type, with each lens unit constructed, from the object side thereof, as follows. The first lens unit Gr1 is composed of a negative meniscus lens element convex to the object side and a rectangular prism PR having a reflective surface for bending the optical axis AX at 90°. The second lens unit Gr2 is composed of a biconcave negative lens element (having aspherical surfaces on both sides) and a positive meniscus lens element convex to the object side. The third lens unit Gr3 is composed of a biconvex positive lens element and a biconcave negative lens element (having an aspherical surface on the image side). The fourth lens unit Gr4 is composed of a cemented lens element produced by cementing together a biconvex positive lens element and a biconcave negative lens element and a cemented lens element produced by cementing together a negative meniscus lens element convex to the object side and a positive meniscus lens element convex to the object side. The fifth lens unit Gr5 is composed solely of a positive meniscus lens element (having aspherical surfaces on both sides) convex to the image side.

Figure 5:
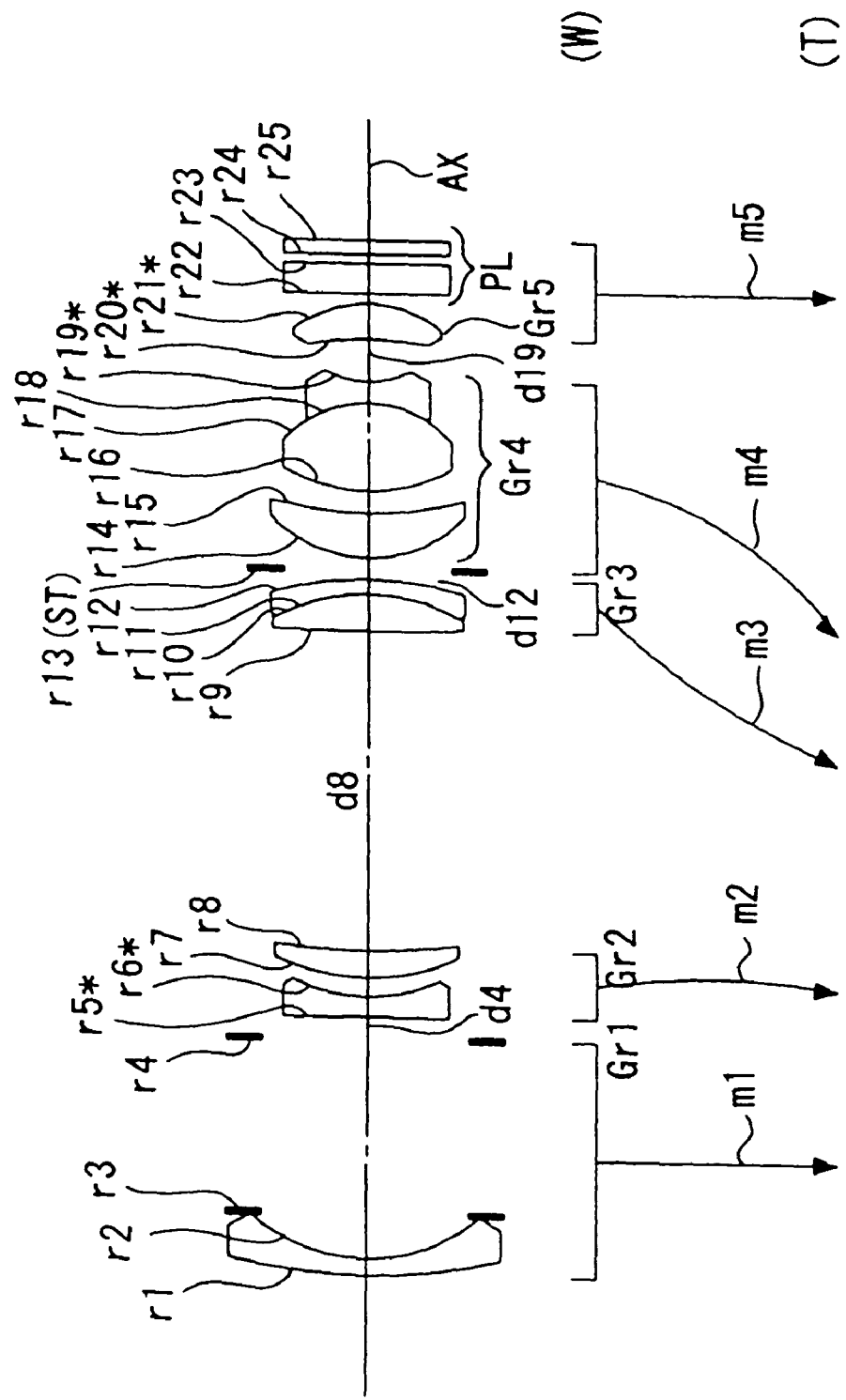
FIG. 5 is a lens construction diagram of a fifth embodiment (Example 5) of the invention.

Fifth Embodiment FIG. 5

The zoom lens system of a fifth embodiment of the invention is a five-unit zoom lens system of a negative-negative-positive-positive-positive type, with each lens unit constructed, from the object side thereof, as follows. The first lens unit Gr1 is composed solely of a negative meniscus lens element convex to the object side. The second lens unit Gr2 is composed of a biconcave negative lens element (having aspherical surfaces on both sides) and a positive meniscus lens element convex to the object side. The third lens unit Gr3 is composed of a cemented positive lens element produced by cementing together a biconvex positive lens element and a negative meniscus lens element convex to the image side. The fourth lens unit Gr4 is composed of a positive meniscus lens element convex to the object side and a cemented lens element (having an aspherical surface on the image side) produced by cementing together a biconvex positive lens element and a biconcave negative lens element. The fifth lens unit Gr5 is composed solely of a positive meniscus lens element (having aspherical surfaces on both sides) convex to the image side.

Figure 6:
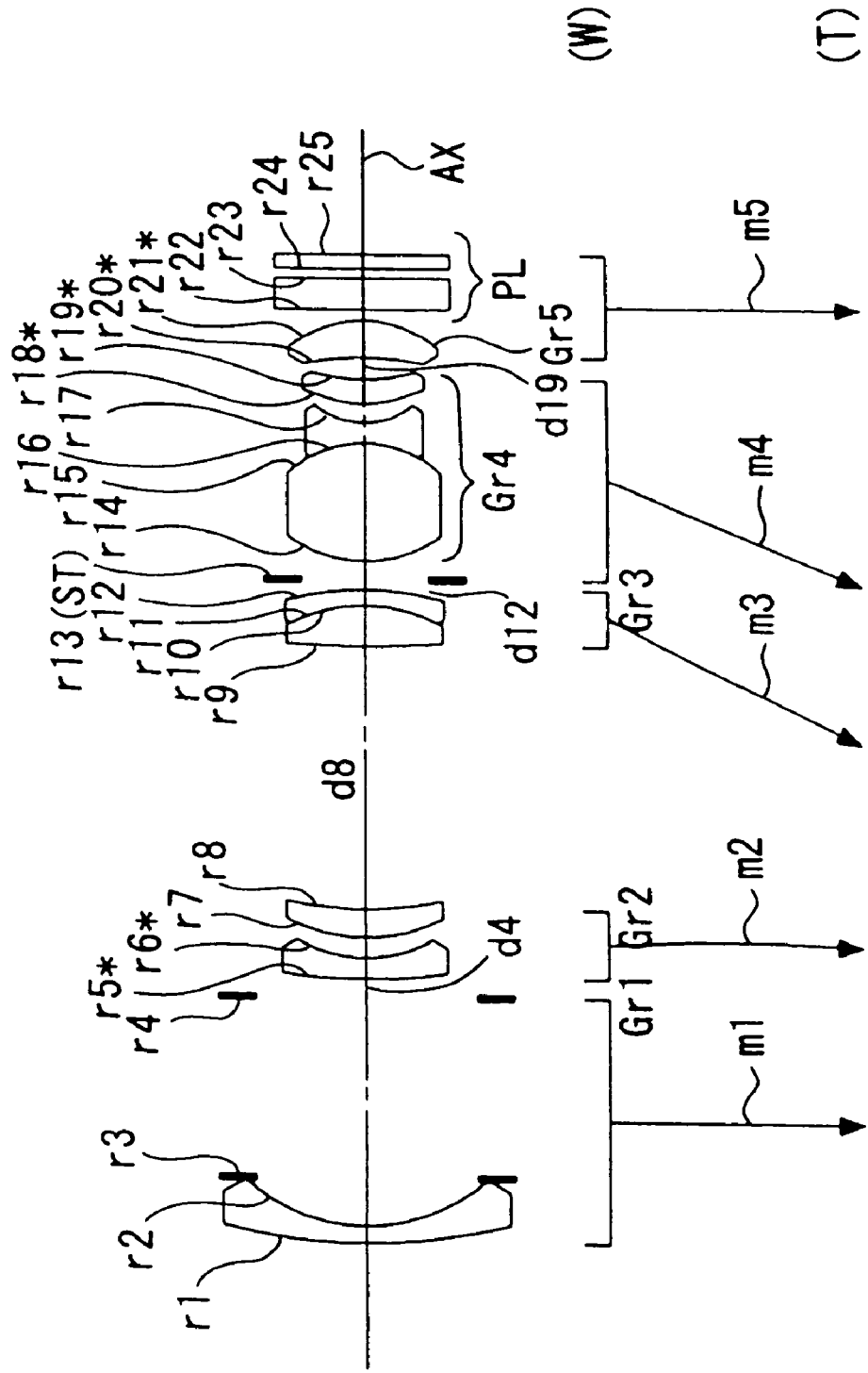
FIG. 6 is a lens construction diagram of a sixth embodiment (Example 6) of the invention.

Sixth Embodiment FIG. 6

The zoom lens system of a sixth embodiment of the invention is a five-unit zoom lens system of a negative-negative-positive-positive-positive type, with each lens unit constructed, from the object side thereof, as follows. The first lens unit Gr1 is composed solely of a negative meniscus lens element convex to the object side. The second lens unit Gr2 is composed of a negative meniscus lens element (having aspherical surfaces on both sides) concave to the image side and a positive meniscus lens element convex to the object side. The third lens unit Gr3 is composed of a cemented positive lens element produced by cementing together a biconvex positive lens element and a negative meniscus lens element convex to the image side. The fourth lens unit Gr4 is composed of a cemented lens element produced by cementing together a biconvex positive lens element and a biconcave negative lens element, and a positive meniscus lens element (having aspherical surfaces on both sides) convex to the object side. The fifth lens unit Gr5 is composed solely of a positive meniscus lens element (having aspherical surfaces on both sides) convex to the image side.

Figure 7:
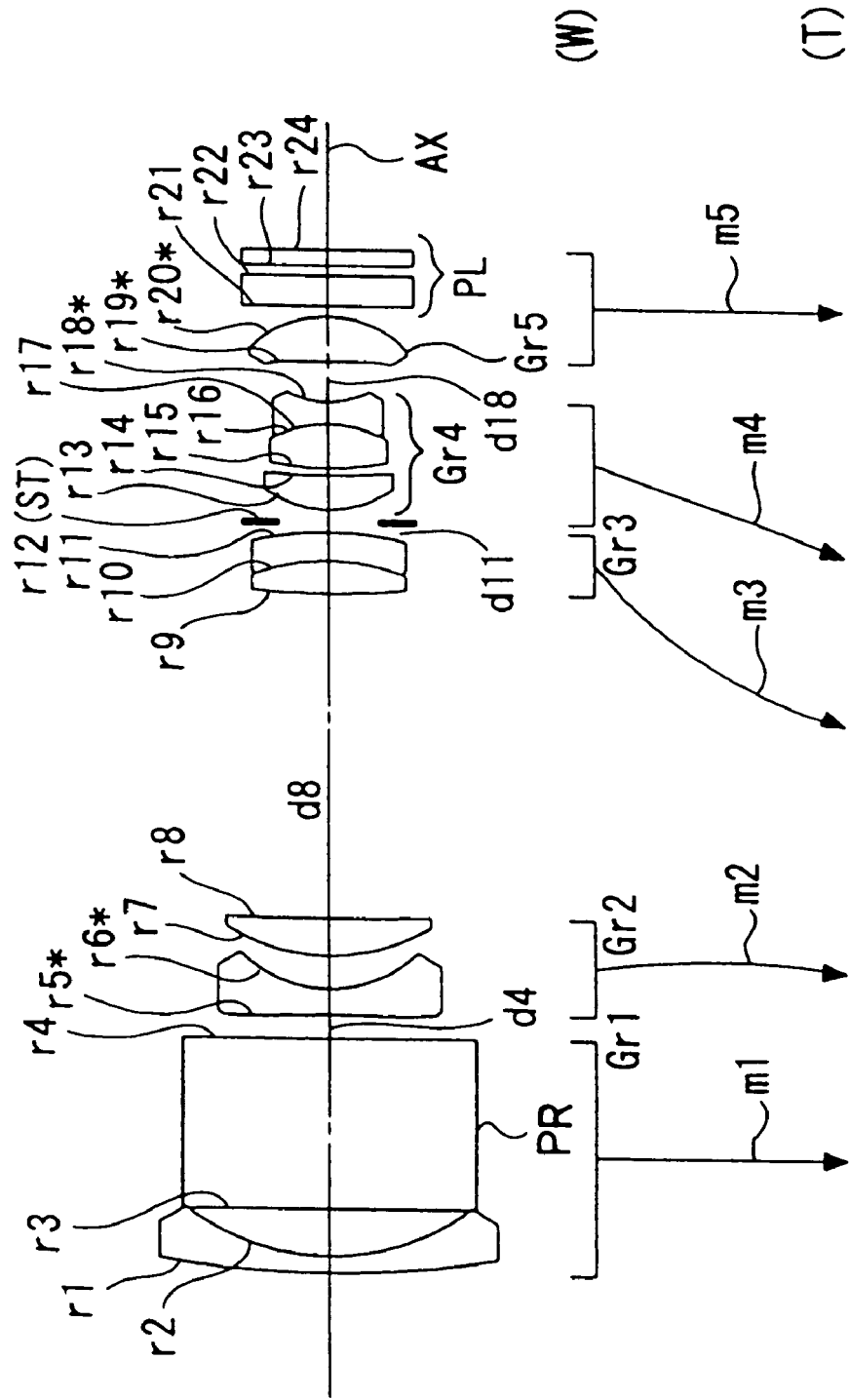
FIG. 7 is a lens construction diagram of a seventh embodiment (Example 7) of the invention.
Figure 8A:
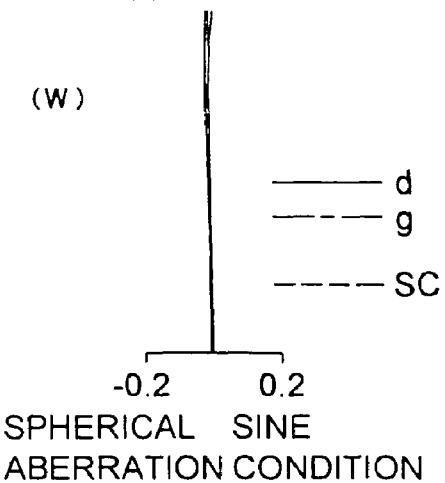
FIGS. 8A to 8I are aberration diagrams of Example 1.
Figure 8B:
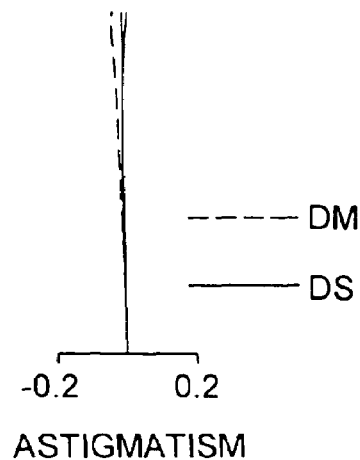
Figure 8C:
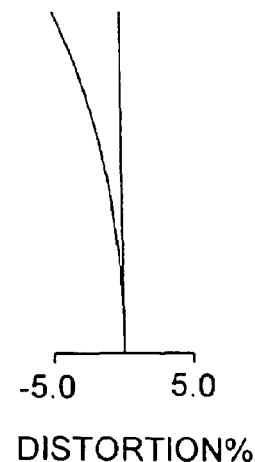
Figure 8D:
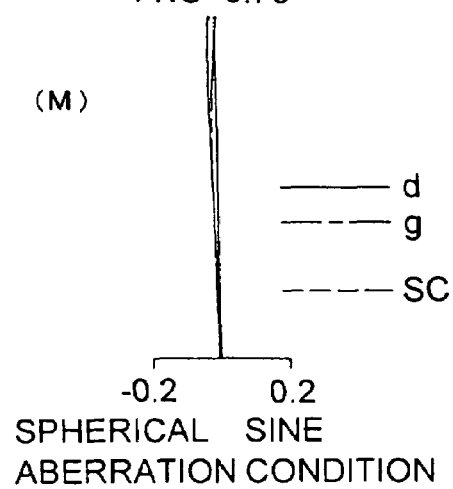
Figure 8E:
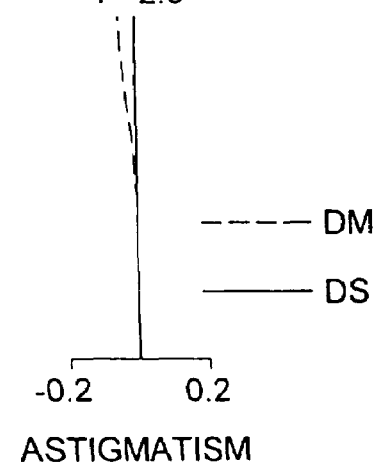
Figure 8F:
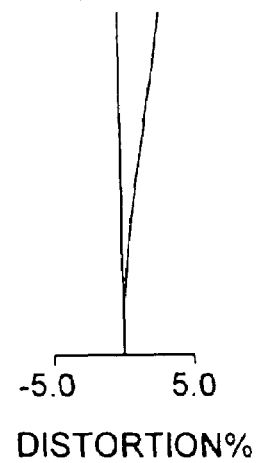
Figure 8G:
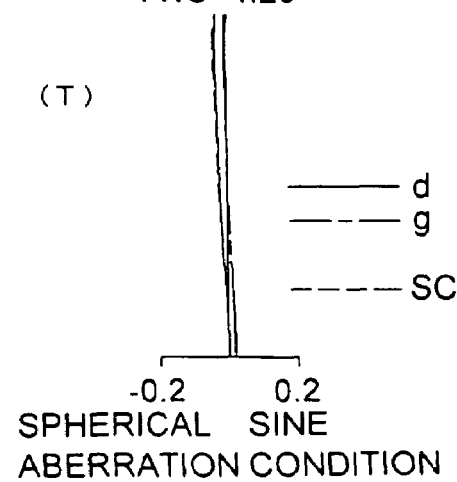
Figure 8H:
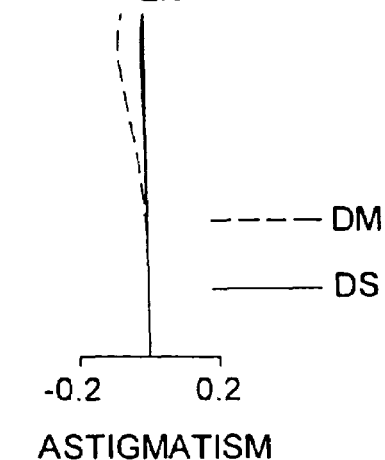
Figure 8I:
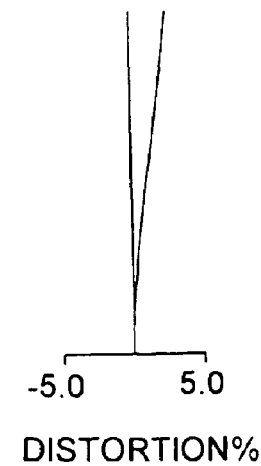
Figure 9A:
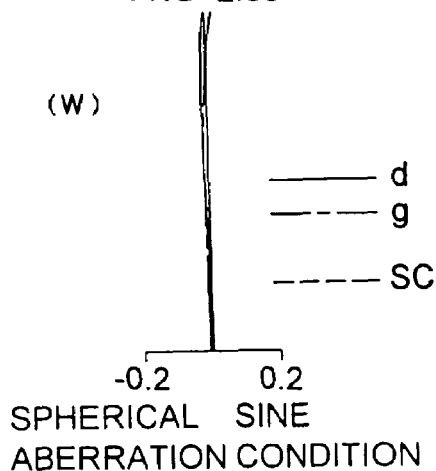
FIGS. 9A to 9I are aberration diagrams of Example 2.
Figure 9B:
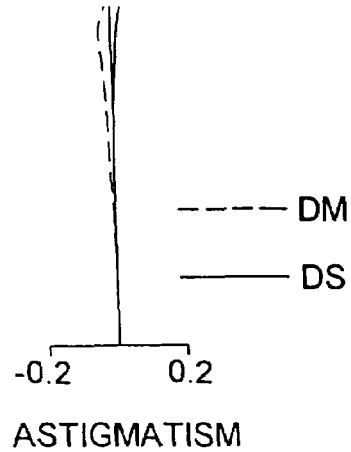
Figure 9C:
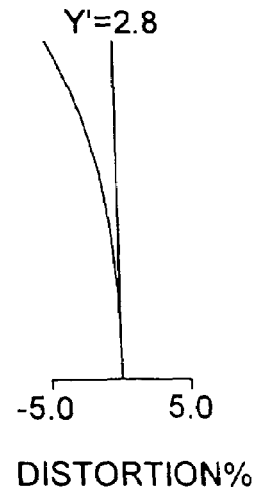
Figure 9D:
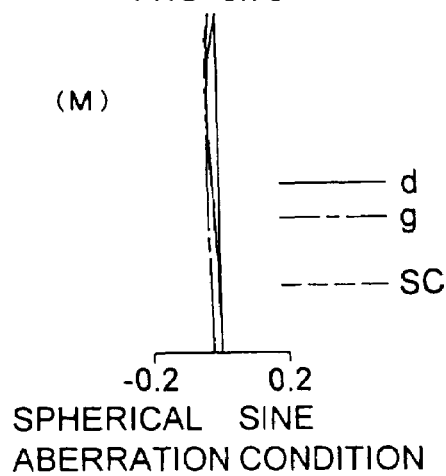
Figure 9E:
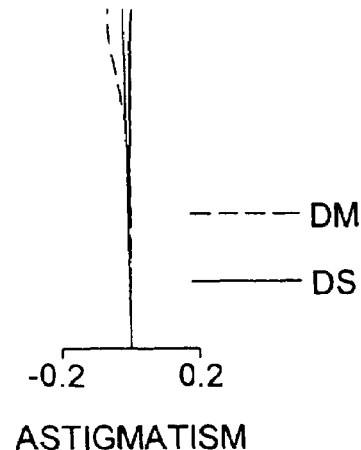
Figure 9F:
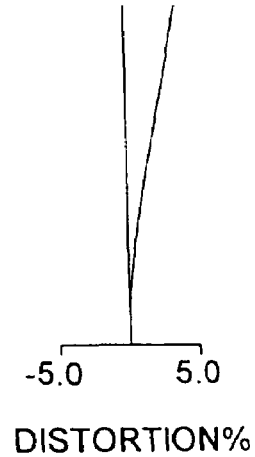
Figure 9G:
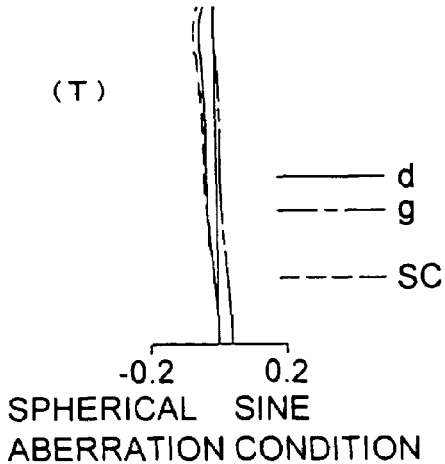
Figure 9H:
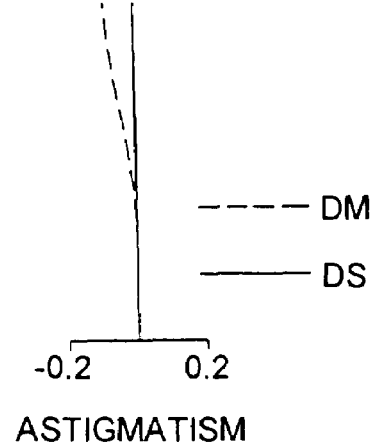
Figure 9I:
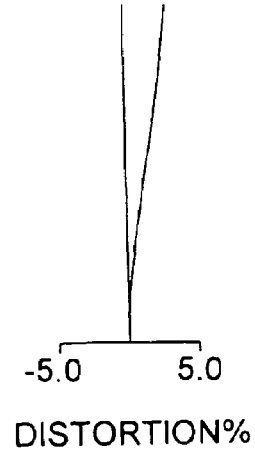
Figure 10A:
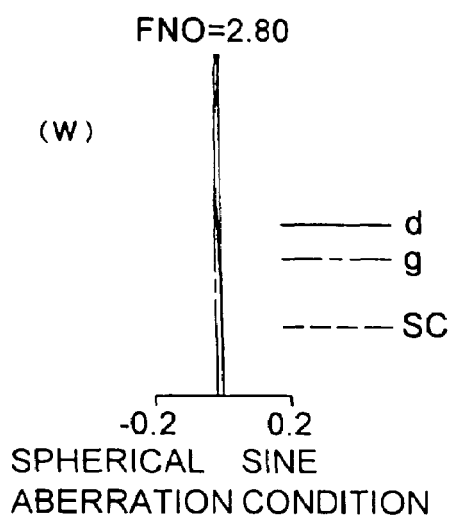
FIGS. 10A to 10I are aberration diagrams of Example 3.
Figure 10B:
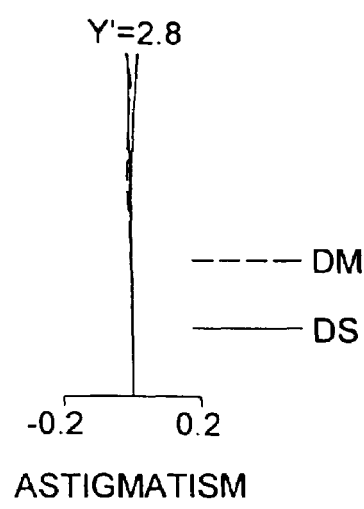
Figure 10C:
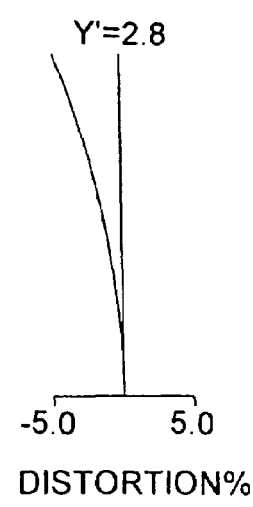
Figure 10D:
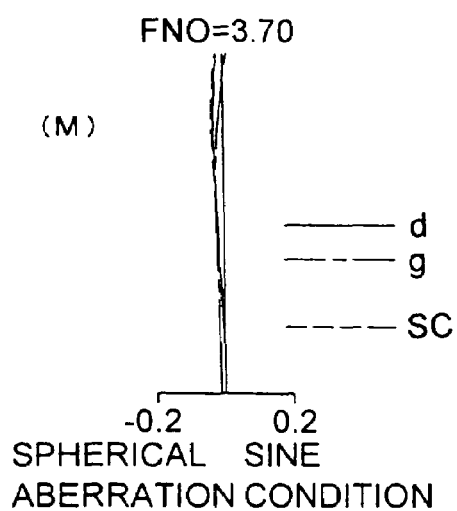
Figure 10E:
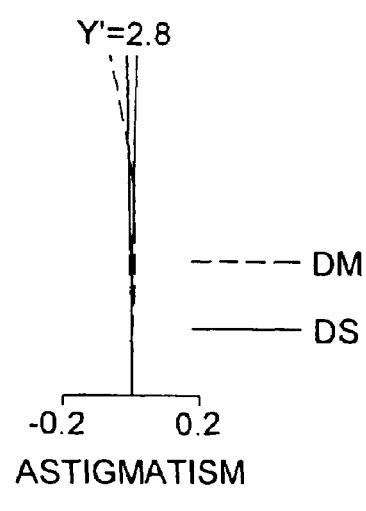
Figure 10F:
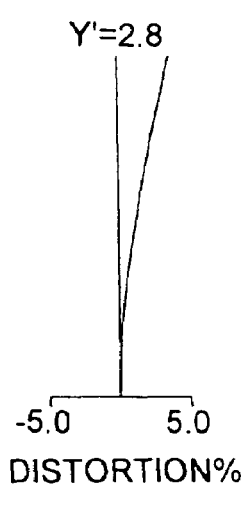
Figure 10G:
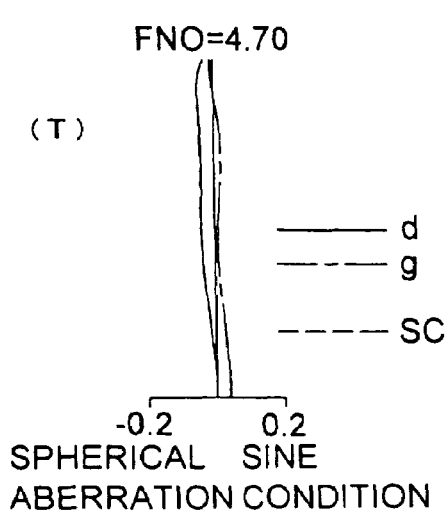
Figure 10H:
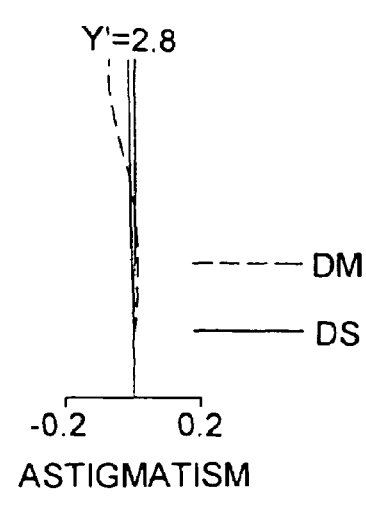
Figure 10I:
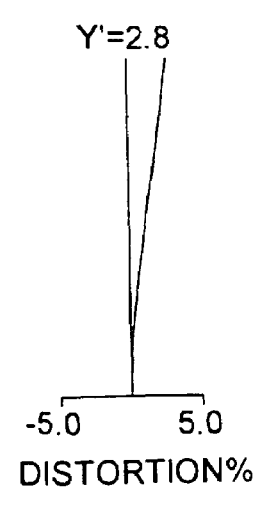
Figure 11A:
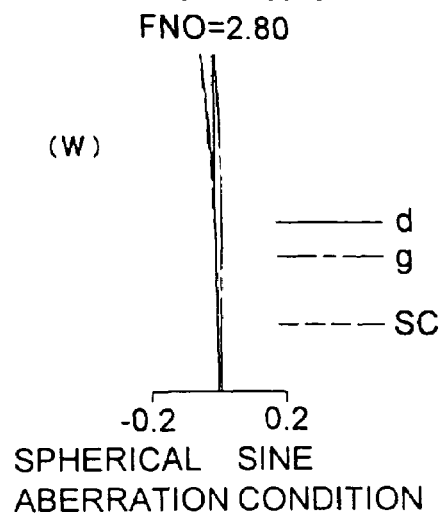
FIGS. 11A to 11I are aberration diagrams of Example 4.
Figure 11B:
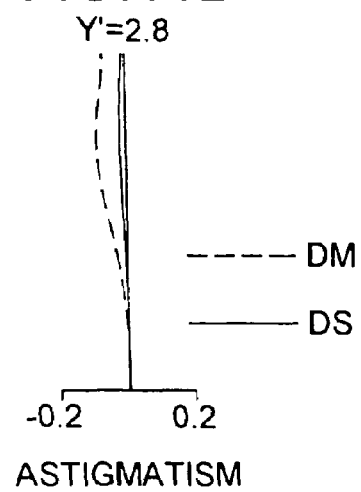
Figure 11C:
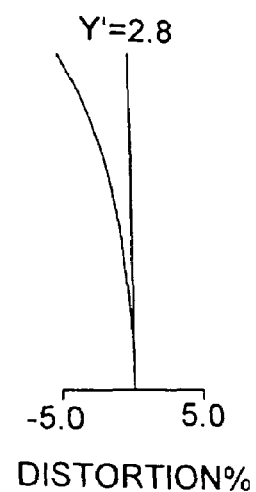
Figure 11D:
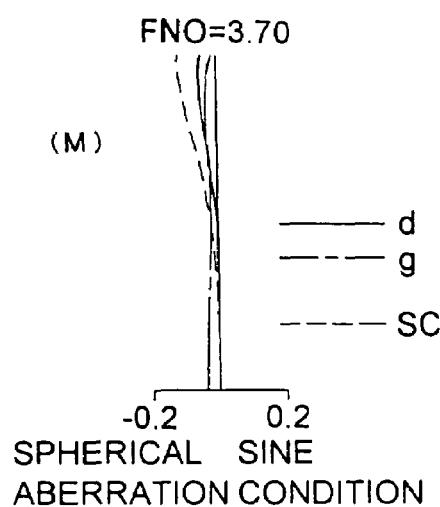
Figure 11E:
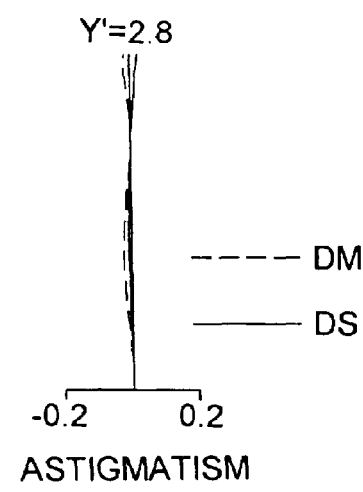
Figure 11F:
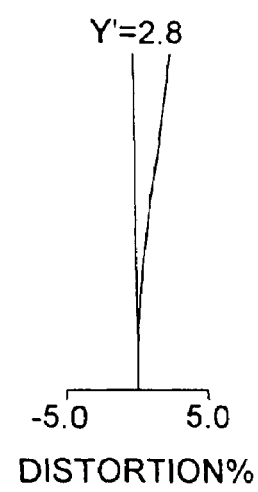
Figure 11G:
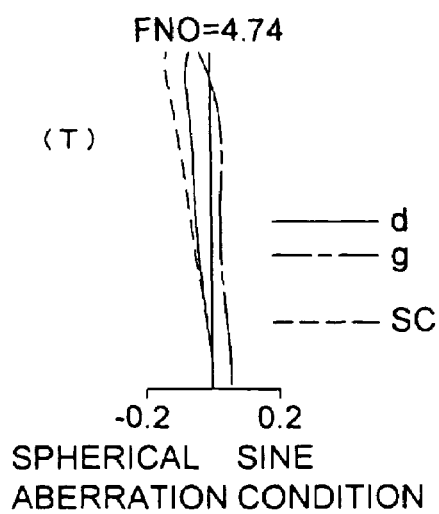
Figure 11H:
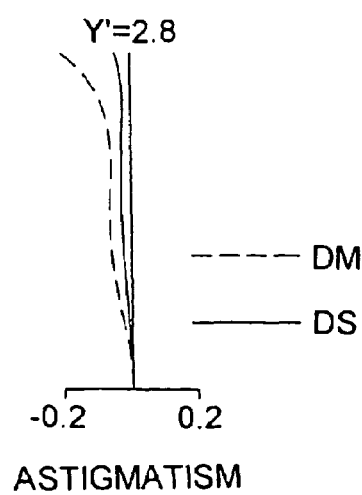
Figure 11I:
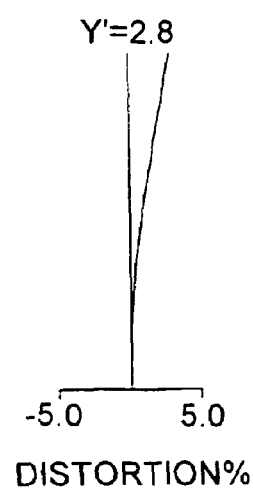
Figure 12A:
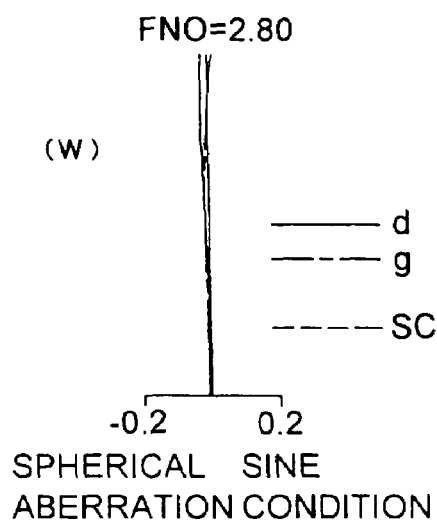
FIGS. 12A to 12I are aberration diagrams of Example 5.
Figure 12B:
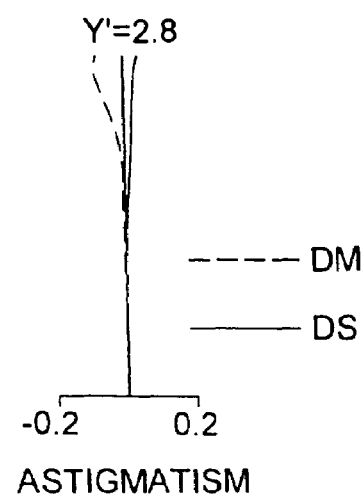
Figure 12C:
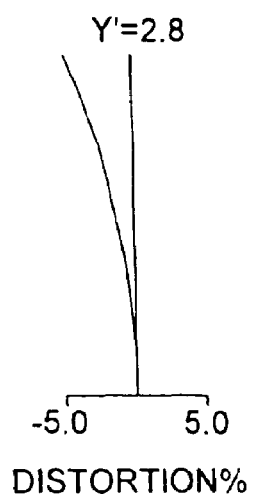
Figure 12D:
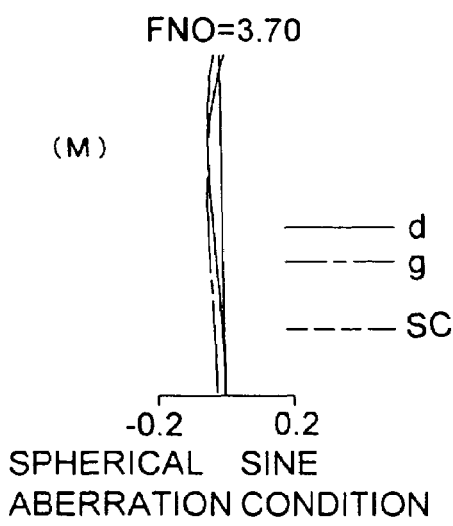
Figure 12E:
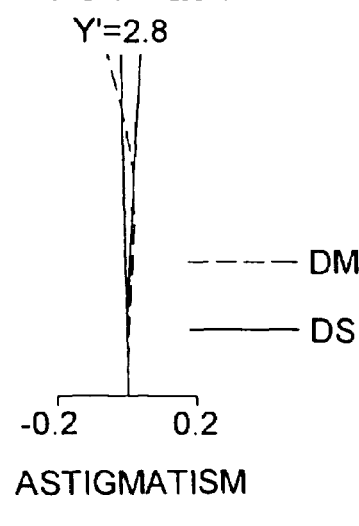
Figure 12F:
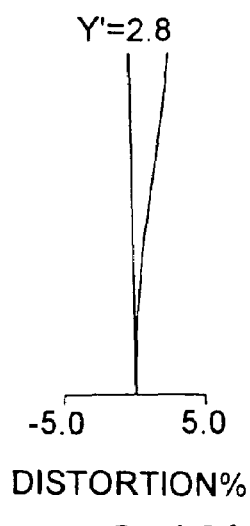
Figure 12G:
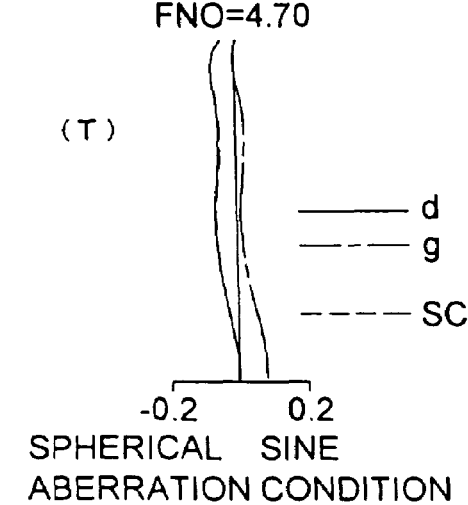
Figure 12H:
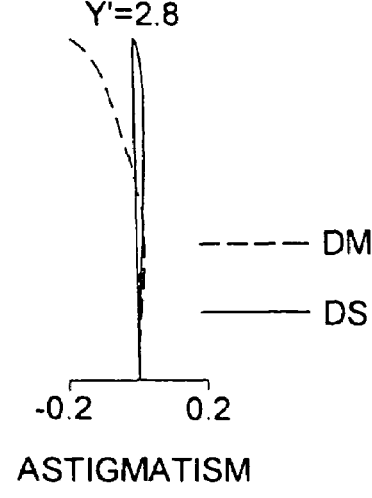
Figure 12I:
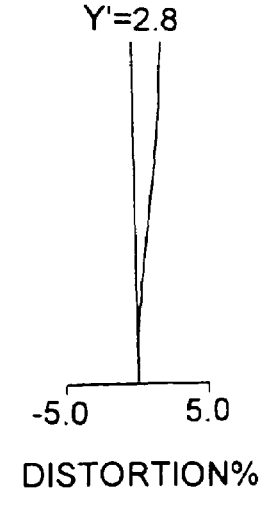

Seventh Embodiment FIG. 7

The zoom lens system of a seventh embodiment of the invention is a five-unit zoom lens system of a negative-negative-positive-positive-positive type, with each lens unit constructed, from the object side thereof, as follows. The first lens unit Gr1 is composed of a negative meniscus lens element convex to the object side and a rectangular prism PR having a reflective surface for bending the optical axis AX at 90°. The second lens unit Gr2 is composed of a biconcave negative lens element (having aspherical surfaces on both sides) and a positive meniscus lens element convex to the object side. The third lens unit Gr3 is composed of a cemented positive lens element produced by cementing together a biconvex positive lens element and a negative meniscus lens element convex to the image side. The fourth lens unit Gr4 is composed of a positive meniscus lens element convex to the object side and a cemented lens element (having an aspherical surface on the image side) produced by cementing together a biconvex positive lens element and a biconcave negative lens element. The fifth lens unit Gr5 is composed solely of a positive meniscus lens element (having aspherical surfaces on both sides) convex to the image side.

In all the embodiments, the zoom lens system is characterized in that it is composed of, from the object side thereof, a first lens unit Gr1 having a negative optical power, a second lens unit Gr2 having a negative optical power, a third lens unit Gr3 having a positive optical power, a fourth lens unit Gr4 having a positive optical power, and a fifth lens unit Gr5 having a positive optical power, and in that it achieves zooming by varying the distances between those lens units. Given the first and second lens units Gr1 and Gr2 negative powers makes it easy to realize a retro-focus type so that the rays incident on the image plane are telecentric. This telecentricity toward the image side is a necessary condition in a taking lens system TL for use in a camera (such as a digital camera) provided with an image sensor SR, because it makes it possible to fully exploit the light-condensing performance of the microlenses provided in front of the solid-state image sensor SR. Thus, it is possible to make the zoom lens system as a whole compact and obtain an image with even brightness.

Moreover, in all the embodiments, the zoom lens system is characterized in that the first lens unit Gr1 remains stationary during zooming and thus zooming is achieved by moving the lens units other than the first lens unit Gr1 in such a way as to vary the distances between the lens units. Keeping the first lens unit Gr1 stationary during zooming makes it possible to achieve compactness while maintaining satisfactory optical performance. In addition, keeping the first lens unit Gr1 stationary makes it possible to achieve inner zooming, leading to reduction of start-up time. Furthermore, keeping the first lens unit Gr1, which has the largest lens diameter, stationary makes it possible to reduce the lens barrel diameter.

Moreover, in all the embodiments, the zoom lens system is so constructed that the third to fifth lens units Gr3 to Gr5 all have a positive power and that an aperture stop ST is disposed between the third and fourth lens units Gr3 and Gr4. That is, a plurality of lens units are disposed on the image side of the second lens unit Gr2, and they include at least two positive lens units, with an aperture stop ST disposed between those two positive lens unit. This construction is desirable to maintain satisfactory optical performance. Disposing the aperture stop ST behind a positive lens unit helps reduce the aperture stop diameter, and thus helps make the shutter unit compact, and is also effective in correcting distortion.

In a zoom lens system, like those of the embodiments, that is composed of five, i.e., a negative, a negative, a positive, a positive, and a positive, lens units, it is preferable that a reflective surface be disposed in the first lens unit Gr1, which remains stationary during zooming. In the first to fourth and seventh embodiments, the zoom lens system has a rectangular prism PR, for bending the optical axis AX at 90°, disposed within the first lens unit Gr1; in the fifth and sixth embodiments, the zoom lens system has a space secured within the first lens unit Gr1 to permit placement of a reflecting member (such as a mirror or prism) for bending the optical axis AX at 90°. Disposing a reflective member such as a mirror or prism in the first lens unit Gr1 so as to bend the optical axis AX at 90° makes it possible not only to keep constant and but also to shorten the length of the zoom lens system in the direction of the optical axis of the incident light. This helps reduce the apparent thickness and size of a camera, and thereby realize a camera of which the thickness does not vary with zooming or as a result of the collapsing of a lens barrel. The optical axis AX may be bent at any angle other than 90° as necessary. The reflective surface may be given an optical power. The optical axis AX may be bent by the use of a refractive or diffractive surface instead of the reflective surface.

In a zoom lens system, like those of the embodiments, that is composed of five, i.e., a negative, a negative, a positive, a positive, and a positive, lens units and in which the first lens unit Gr1, which remains stationary during zooming, includes a reflective surface, it is preferable that condition (1) below be fulfilled.

$$2 < |f1/fW| < 6 \quad (1)$$

where
fl represents the focal length of the lens group located on the object side of the reflective surface; and
fW represents the focal length of the zoom lens system as a whole at the wide-angle end W.

Condition (1) defines the preferable focal length of the lens group located in front of the reflective surface within the first lens unit Gr1. If the lower limit of condition (1) is transgressed, the lens group located in front of the reflective surface has too short a focal length. This causes extremely large distortion, in particular negative distortion at the wide-angle end, and thus makes it difficult to maintain satisfactory optical performance. By contrast, if the upper limit of condition (1) is transgressed, the lens group located in front of the reflective surface has too long a focal length, and thus the power with which it makes the rays incident on the first lens unit Gr1 converge is too weak. This makes the lens diameter of the first lens unit Gr1 and the reflective member unduly large, which is undesirable for miniaturization.

In a zoom lens system, like those of the embodiments, that is composed of five, i.e., a negative, a negative, a positive, a positive, and a positive, lens units and in which the first lens unit Gr1 remains stationary during zooming, it is preferable that condition (2) below be fulfilled.

$$2 < |f12/fW| < 5 \quad (2)$$

where
fl2 represents the composite focal length of the first and second lens units at the wide-angle end W; and
fW represents the focal length of the zoom lens system as a whole at the wide-angle end W.

Condition (2) defines the preferable range of the composite focal length of the first and second lens units Gr1 and Gr2 at the wide-angle end W. If the upper limit of condition (2) is transgressed, the composite focal length of the first and second lens units Gr1 and Gr2 is too long. This makes the total length of the zoom lens system unduly large. Moreover, transgressing the upper limit of condition (2) reduces the power with which the first and second lens units Gr1 and Gr2 make rays converge. This makes the external diameter of the lenses unduly large, and thus makes it impossible to realize a compact zoom lens system. By contrast, if the lower limit of condition (2) is transgressed, the composite focal length of the first and second lens units Gr1 and Gr2 is too short. This causes the first and second lens units Gr1 and Gr2 to produce extremely large negative distortion at the wide-angle end W, which is difficult to correct.

It is further preferable that conditional formula (2a) below be fulfilled. Conditional formula (2a) defines a further preferable conditional range within that defined by conditional formula (2) above.

$$2<|f2/fW|<4 \tag{2a}$$

In all the embodiments, the zoom lens system is composed solely of refractive lens elements, which deflect incident light by refraction (i.e. lens elements of the type that deflects light at the interface between two media having different refractive indices). It is possible, however, to replace any of these lens elements with a lens element of any other type, for example, a diffractive lens element, which deflects incident light by diffraction, or a refractive/diffractive hybrid lens element, which deflects incident light by diffraction and refraction combined together, or a gradient index lens element, which deflects incident light with varying refractive indices distributed within a medium. In addition to the aperture stop ST, a beam restricting plate or the like for cutting unnecessary light may be arranged as necessary.

EXAMPLES

Hereinafter, practical examples of the construction and other features of zoom lens systems for use in taking lens apparatuses embodying the invention will be presented with reference to their construction data and other data. Tables 1 to 7 show the construction data of Examples 1 to 7, respectively. Examples 1 to 7 correspond to the first to seventh embodiments described hereinabove. Thus, the lens construction diagrams (FIGS. 1 to 7) of the first to seventh embodiments also show the lens constructions of Examples 1 to 7, respectively.

In the construction data of each example, ri (i=1, 2, 3, . . . ) represents the radius of curvature (mm) of the i-th surface from the object side, di (i=1, 2, 3, . . . ) represents the i-th axial distance (mm) from the object side, and Ni (i=1, 2, 3, . . . ) and vi (i=1, 2, 3, . . . ) respectively represent the refractive index (Nd) for the d-line and the Abbe number (vd) of the i-th optical element from the object side. For each of those axial distances which vary during zooming, i.e. variable axial distances, three values are listed, namely, from left, the axial distance observed at the wide-angle end (shortest-focal-length end, W), the axial distance observed at the middle (middle-focal-length point, M), and the axial distance observed at the telephoto end (longest-focal-length end). Shown together with these data are the focal length (f, mm) of the taking lens system as a whole and the f-number (FNO) observed in those three different focal-length conditions W, M, and T. Table 8 shows the values of the conditional formulae as actually observed in Examples 1 to 7.

A surface of which the radius of curvature ri is marked with an asterisk (*) is an aspherical surface (a refractive optical surface having an aspherical shape, a surface that exerts a refractive effect equivalent to that of an aspherical surface, or the like). The surface shape of such an aspherical surface is defined by formula (AS) below. The aspherical surface data of the aspherical surfaces used in each example are also shown (except when Ai=0) together with the other data mentioned above.

$$X(H)=(C0 \cdot H^2)/(1+\sqrt{1-\epsilon \cdot C0^2 \cdot H^2})+\Sigma(Ai \cdot H^i) \tag{AS}$$

where
   X(H) represents the displacement along the optical axis AX at the height H (relative to the vertex);
   H represents the height in a direction perpendicular to the optical axis AX;
   C0 represents the paraxial curvature (=the reciprocal of the radius of curvature);
   $\epsilon$ represents the quadric surface parameter; and
   Ai represents the aspherical surface coefficient of i-th order.

FIGS. 8A to 8I, FIGS. 9A to 9I, 10A to 10I, FIGS. 11A to 11I, 12A to 12I, FIGS. 13A to 13I, and FIGS. 14A to 14I are aberration diagrams of Examples 1 to 7, respectively. Of these aberration diagrams, FIGS. 8A, 8B, 8C, 9A, 9B, 9C, 10A, 10B, 10C, 11A, 11B, 11C, 12A, 12B, 12C, 13A, 13B, 13C, 14A, 14B, and 14C show the aberrations observed at the wide-angle end W, FIGS. 8D, 8E, 8F, 9D, 9E, 9F, 10D, 10E, 10F, 11D, 11E, 11F, 12D, 12E, 12F, 13D, 13E, 13F, 14D, 14E, and 14F show the aberrations observed at the middle M, and FIGS. 8G, 8H, 8I, 9G, 9H, 9I, 10G, 10H, 10I, 11G, 11H, 11I, 12G, 12H, 12I, 13G, 13H, 13I, 14G, 14H, and 14I show the aberrations observed at the telephoto end T. Of these aberration diagrams, FIGS. 8A, 8D, 8G, 9A, 9D, 9G, 10A, 10D, 10G, 11A, 11D, 11G, 12A, 12D, 12G, 13A, 13D, 13G, 14A, 14D, and 14G show spherical aberration and sine condition, FIGS. 8B, 8E, 8H, 9B, 9E, 9H, 10B, 10E, 10H, 11B, 11E, 11H, 12B, 12E, 12H, 13B, 13E, 13H, 14B, 14E, and 14H show astigmatism, and FIGS. 8C, 8F, 8I, 9C, 9F, 9I, 10C, 10F, 10I, 11C, 11F, 11I, 12C, 12F, 12I, 13C, 13F, 13I, 14C, 14F, and 14I show distortion, with Y' representing the maximum image height (mm). In the spherical aberration diagrams, the solid line (d) and dash-and-dot line (g) represent the spherical aberration (mm) observed for the d- and g-lines, respectively, and the broken line (SC) represents the deviation (mm) from the sine condition to be fulfilled. In the astigmatism diagrams, the broken line (DM) and solid line (DS) represent the astigmatism (mm) observed for the d-line on the meridional and sagittal planes, respectively. In the distortion diagrams, the solid line represents the distortion (%) observed for the d-line.

As described above, according to the present invention, it is possible to realize a taking lens apparatus provided with a novel, compact zoom lens system that offers a high zoom ratio and high image quality simultaneously. By applying the present invention to a digital camera, video camera, or camera incorporated in or externally fitted to a digital video unit, personal computer, mobile computer, cellular phone, personal digital assistant (PDA), or the like, it is possible to achieve miniaturization, cost reduction, higher zoom ratios, and higher performance in such apparatuses.

TABLE 1

Example 1
f = 5.00~9.50~15.00
FNO = 2.80~3.70~4.20

| Radius of Curvature | Axial Distance | Refractive Index | Abbe Number |
|---|---|---|---|
| (Gr1) | | | |
| r1 = 31.701 | d1 = 0.900 | N1 = 1.85000 | v1 = 40.04 |
| r2 = 8.647 | d2 = 2.088 | | |
| r3 = ∞ | d3 = 8.500 | N2 = 1.84666 | v2 = 23.82 |
| r4 = ∞ | d4 = 3.233~1.674~1.200 | | |
| (Gr2) | | | |
| r5* = −21.782 | d5 = 1.100 | N3 = 1.52200 | v3 = 52.20 |
| r6* = 11.586 | d6 = 0.900 | | |
| r7 = 14.073 | d7 = 1.524 | N4 = 1.80518 | v4 = 25.43 |
| r8 = 358422.94 | d8 = 13.310~4.790~0.700 | | |

TABLE 1-continued

Example 1
f = 5.00~9.50~15.00
FNO = 2.80~3.70~4.20

(Gr3)

| | | | |
|---|---|---|---|
| r9 = 43.083 | d9 = 2.062 | N5 = 1.63854 | ν5 = 55.62 |
| r10 = −9.180 | d10 = 0.800 | N6 = 1.84666 | ν6 = 23.82 |
| r11 = −16.737 | d11 = 2.856~8.402~5.980 | | |

(ST)

| | | | |
|---|---|---|---|
| r12 = ∞ | d12 = 0.722 | | |

(Gr4)

| | | | |
|---|---|---|---|
| r13 = 7.459 | d13 = 1.978 | N7 = 1.62041 | ν7 = 60.29 |
| r14 = 33.058 | d14 = 1.044 | | |
| r15 = 11.623 | d15 = 3.032 | N8 = 1.75000 | ν8 = 25.14 |
| r16 = −5.814 | d16 = 0.010 | N9 = 1.51400 | ν9 = 42.83 |
| r17 = −5.814 | d17 = 1.357 | N10 = 1.84506 | ν10 = 23.66 |
| r18* = 5.068 | d18 = 2.371~6.904~13.890 | | |

(Gr5)

| | | | |
|---|---|---|---|
| r19* = −18.602 | d19 = 2.356 | N11 = 1.52200 | ν11 = 52.20 |
| r20* = −5.401 | d20 = 0.600 | | |

(PL)

| | | | |
|---|---|---|---|
| r21 = ∞ | d21 = 1.667 | N12 = 1.51680 | ν12 = 64.20 |
| r22 = ∞ | d22 = 0.556 | | |
| r23 = ∞ | d23 = 0.833 | N13 = 1.51680 | ν13 = 64.20 |
| r24 = ∞ | | | |

Aspherical Surface Data of Surface r5

$\epsilon = 1.0000$, $A4 = 0.29414098 \times 10^{-3}$,
$A6 = -0.24733506 \times 10^{-4}$, $A8 = 0.87070898 \times 10^{-6}$,
$A10 = -0.12827015 \times 10^{-7}$ Aspherical Surface Data of Surface r6

$\epsilon = 1.0000$, $A4 = 0.20824187 \times 10^{-3}$,
$A6 = -0.22777976 \times 10^{-4}$, $A8 = 0.83844415 \times 10^{-6}$,
$A10 = -0.12745727 \times 10^{-7}$ Aspherical Surface Data of Surface r18

$\epsilon = 1.0000$, $A4 = 0.62307152 \times 10^{-3}$,
$A6 = 0.42691528 \times 10^{-4}$, $A8 = -0.38772774 \times 10^{-5}$ Aspherical Surface Data of Surface r19

$\epsilon = 1.0000$, $A4 = -0.36121443 \times 10^{-3}$,
$A6 = 0.37845288 \times 10^{-4}$, $A8 = -0.54090483 \times 10^{-5}$,
$A10 = 0.38670552 \times 10^{-7}$ Aspherical Surface Data of Surface r20

$\epsilon = 1.0000$, $A4 = 0.14658788 \times 10^{-2}$,
$A6 = -0.77179378 \times 10^{-5}$, $A8 = -0.14042061 \times 10^{-5}$

TABLE 2

Example 2
f = 4.70~8.93~18.10
FNO = 2.80~3.70~4.70

| Radius of Curvature | Axial Distance | Refractive Index | Abbe Number |
|---|---|---|---|

(Gr1)

| | | | |
|---|---|---|---|
| r1 = 29.581 | d1 = 0.900 | N1 = 1.85000 | ν1 = 40.04 |
| r2 = 8.967 | d2 = 2.365 | | |
| r3 = ∞ | d3 = 9.700 | N2 = 1.84666 | ν2 = 23.82 |
| r4 = ∞ | d4 = 1.308~1.500~1.200 | | |

(Gr2)

| | | | |
|---|---|---|---|
| r5* = −89.908 | d5 = 1.100 | N3 = 1.52200 | ν3 = 52.20 |
| r6* = 9.503 | d6 = 0.964 | | |

TABLE 2-continued

Example 2
f = 4.70~8.93~18.10
FNO = 2.80~3.70~4.70

| | | | |
|---|---|---|---|
| r7 = 11.195 | d7 = 1.533 | N4 = 1.80518 | ν4 = 25.43 |
| r8 = 35.938 | d8 = 18.544~7.394~0.727 | | |

(Gr3)

| | | | |
|---|---|---|---|
| r9 = 41.873 | d9 = 2.051 | N5 = 1.67003 | ν5 = 47.15 |
| r10 = −9.073 | d10 = 0.892 | N6 = 1.84666 | ν6 = 23.82 |
| r11 = −18.353 | d11 = 0.500~7.808~3.323 | | |

(ST)

| | | | |
|---|---|---|---|
| r12 = ∞ | d12 = 0.722 | | |

(Gr4)

| | | | |
|---|---|---|---|
| r13 = 7.528 | d13 = 2.210 | N7 = 1.48749 | ν7 = 70.44 |
| r14 = 92.758 | d14 = 0.100 | | |
| r15 = 9.446 | d15 = 3.641 | N8 = 1.75000 | ν8 = 25.14 |
| r16 = −5.823 | d16 = 0.010 | N9 = 1.51400 | ν9 = 42.83 |
| r17 = −5.823 | d17 = 1.264 | N10 = 1.84506 | ν10 = 23.66 |
| r18* = 4.320 | d18 = 2.396~6.046~17.499 | | |

(Gr5)

| | | | |
|---|---|---|---|
| r19* = −19.624 | d19 = 2.719 | N11 = 1.52200 | ν11 = 52.20 |
| r20* = −5.442 | d20 = 0.600 | | |

(PL)

| | | | |
|---|---|---|---|
| r21 = ∞ | d21 = 1.667 | N12 = 1.51680 | ν12 = 64.20 |
| r22 = ∞ | d22 = 0.556 | | |
| r23 = ∞ | d23 = 0.833 | N13 = 1.51680 | ν13 = 64.20 |
| r24 = ∞ | | | |

Aspherical Surface Data of Surface r5

$\epsilon = 1.0000$, $A4 = 0.43287302 \times 10^{-3}$,
$A6 = -0.23455601 \times 10^{-4}$, $A8 = 0.61044666 \times 10^{-6}$,
$A10 = -0.73047026 \times 10^{-8}$ Aspherical Surface Data of Surface r6

$\epsilon = 1.0000$, $A4 = 0.35966870 \times 10^{-3}$,
$A6 = -0.24537299 \times 10^{-4}$, $A8 = 0.65258692 \times 10^{-6}$,
$A10 = -0.80900599 \times 10^{-8}$ Aspherical Surface Data of Surface r18

$\epsilon = 1.0000$, $A4 = 0.19355856 \times 10^{-3}$,
$A6 = 0.37255767 \times 10^{-4}$, $A8 = -0.71943922 \times 10^{-5}$ Aspherical Surface Data of Surface r19

$\epsilon = 1.0000$, $A4 = 0.20399908 \times 10^{-4}$,
$A6 = -0.15841416 \times 10^{-4}$, $A8 = -0.23969077 \times 10^{-5}$,
$A10 = 0.62558678 \times 10^{-7}$ Aspherical Surface Data of Surface r20

$\epsilon = 1.0000$, $A4 = 0.20176156 \times 10^{-2}$,
$A6 = -0.66245685 \times 10^{-4}$, $A8 = 0.13610484 \times 10^{-5}$

TABLE 3

Example 3
f = 4.70~8.93~18.33
FNO = 2.80~3.70~4.70

| Radius of Curvature | Axial Distance | Refractive Index | Abbe Number |
|---|---|---|---|

(Gr1)

| | | | |
|---|---|---|---|
| r1 = 30.875 | d1 = 0.954 | N1 = 1.85000 | ν1 = 40.04 |
| r2 = 9.153 | d2 = 2.354 | | |
| r3 = ∞ | d3 = 10.100 | N2 = 1.84666 | ν2 = 23.82 |
| r4 = ∞ | d4 = 6.292~2.960~1.300 | | |

TABLE 3-continued

Example 3
f = 4.70~8.93~18.33
FNO = 2.80~3.70~4.70

(Gr2)

| | | | |
|---|---|---|---|
| r5* = −15.727 | d5 = 1.100 | N3 = 1.52200 | ν3 = 52.20 |
| r6* = 12.473 | d6 = 0.918 | | |
| r7 = 12.002 | d7 = 1.500 | N4 = 1.80518 | ν4 = 25.43 |
| r8 = 94.922 | d8 = 13.325~5.877~0.700 | | |

(Gr3)

| | | | |
|---|---|---|---|
| r9 = 84.102 | d9 = 1.948 | N5 = 1.69100 | ν5 = 54.75 |
| r10 = −9.398 | d10 = 0.800 | N6 = 1.84666 | ν6 = 23.82 |
| r11 = −18.254 | d11 = 0.500~6.977~2.315 | | |

(ST)

| | | | |
|---|---|---|---|
| r12 = ∞ | d12 = 0.722 | | |

(Gr4)

| | | | |
|---|---|---|---|
| r13 = 6.914 | d13 = 2.634 | N7 = 1.67000 | ν7 = 57.07 |
| r14 = −178.846 | d14 = 0.500 | | |
| r15 = −110.237 | d15 = 3.600 | N8 = 1.71300 | ν8 = 53.93 |
| r16 = −6.743 | d16 = 0.010 | N9 = 1.51400 | ν9 = 42.83 |
| r17 = −6.743 | d17 = 1.000 | N10 = 1.83400 | ν10 = 37.05 |
| r18 = 7.808 | d18 = 0.897 | | |
| r19* = 10.638 | d19 = 1.818 | N11 = 1.84506 | ν11 = 23.66 |
| r20 = 8.447 | d20 = 1.166~5.469~16.967 | | |

(Gr5)

| | | | |
|---|---|---|---|
| r21* = −16.174 | d21 = 2.116 | N12 = 1.52200 | ν12 = 52.20 |
| r22* = −5.130 | d22 = 0.600 | | |

(PL)

| | | | |
|---|---|---|---|
| r23 = ∞ | d23 = 1.667 | N13 = 1.51680 | ν13 = 64.20 |
| r24 = ∞ | d24 = 0.556 | | |
| r25 = ∞ | d25 = 0.833 | N14 = 1.51680 | ν14 = 64.20 |
| r26 = ∞ | | | |

Aspherical Surface Data of Surface r5

$\epsilon = 1.0000$, $A4 = 0.17397967 \times 10^{-2}$,
$A6 = -0.91160979 \times 10^{-4}$, $A8 = 0.29224094 \times 10^{-5}$,
$A10 = -0.40584567 \times 10^{-7}$ Aspherical Surface Data of Surface r6

$\epsilon = 1.0000$, $A4 = 0.16445071 \times 10^{-2}$,
$A6 = -0.88694544 \times 10^{-4}$, $A8 = 0.27470200 \times 10^{-5}$,
$A10 = -0.36829935 \times 10^{-7}$ Aspherical Surface Data of Surface r19

$\epsilon = 1.0000$, $A4 = -0.10051789 \times 10^{-2}$,
$A6 = -0.43416227 \times 10^{-4}$, $A8 = -0.94308727 \times 10^{-6}$ Aspherical Surface Data of Surface r21

$\epsilon = 1.0000$, $A4 = -0.11122267 \times 10^{-2}$,
$A6 = 0.69843781 \times 10^{-4}$, $A8 = -0.56596129 \times 10^{-5}$,
$A10 = 0.16600757 \times 10^{-7}$ Aspherical Surface Data of Surface r22

$\epsilon = 1.0000$, $A4 = 0.10462187 \times 10^{-2}$,
$A6 = 0.16953135 \times 10^{-4}$, $A8 = -0.13778696 \times 10^{-5}$

TABLE 4

Example 4
f = 4.65~10.70~21.39
FNO = 2.80~3.70~4.74

| Radius of Curvature | Axial Distance | Refractive Index | Abbe Number |
|---|---|---|---|
| (Gr1) | | | |
| r1 = 31.684 | d1 = 0.900 | N1 = 1.75450 | ν1 = 51.57 |
| r2 = 8.835 | d2 = 2.500 | | |
| r3 = ∞ | d3 = 9.800 | N2 = 1.84666 | ν2 = 23.82 |
| r4 = ∞ | d4 = 1.787~2.959~1.200 | | |
| (Gr2) | | | |
| r5* = −11.414 | d5 = 1.200 | N3 = 1.52200 | ν3 = 52.20 |
| r6* = 18.668 | d6 = 0.920 | | |
| r7 = 14.124 | d7 = 1.500 | N4 = 1.80518 | ν4 = 25.43 |
| r8 = 89.378 | d8 = 20.132~6.055~0.700 | | |
| (Gr3) | | | |
| r9 = 15.760 | d9 = 2.270 | N5 = 1.75450 | ν5 = 51.57 |
| r10 = −18.349 | d10 = 0.350 | | |
| r11 = −31.434 | d11 = 0.800 | N6 = 1.84506 | ν6 = 23.66 |
| r12* = 58.279 | d12 = 0.586~7.312~0.715 | | |
| (ST) | | | |
| r13 = ∞ | d13 = 0.722 | | |
| (Gr4) | | | |
| r14 = 7.070 | d14 = 3.262 | N7 = 1.75450 | ν7 = 51.57 |
| r15 = −68.783 | d15 = 0.010 | N8 = 1.51400 | ν8 = 42.83 |
| r16 = −68.783 | d16 = 0.800 | N9 = 1.80750 | ν9 = 35.43 |
| r17 = 5.297 | d17 = 1.121 | | |
| r18 = 8.058 | d18 = 0.900 | N10 = 1.80420 | ν10 = 46.50 |
| r19 = 4.975 | d19 = 0.010 | N11 = 1.51400 | ν11 = 42.83 |
| r20 = 4.975 | d20 = 2.275 | N12 = 1.54072 | ν12 = 47.20 |
| r21 = 55.131 | d21 = 2.641~9.825~24.000 | | |
| (Gr5) | | | |
| r22* = −5.314 | d22 = 2.000 | N13 = 1.52200 | ν13 = 52.20 |
| r23* = −4.081 | d23 = 2.069~1.065~0.600 | | |
| (PL) | | | |
| r24 = ∞ | d24 = 1.667 | N14 = 1.51680 | ν14 = 64.20 |
| r25 = ∞ | d25 = 0.556 | | |
| r26 = ∞ | d26 = 0.833 | N15 = 1.51680 | ν15 = 64.20 |
| r27 = ∞ | | | |

Aspherical Surface Data of Surface r5

$\epsilon = 1.0000$, $A4 = 0.19404962 \times 10^{-2}$,
$A6 = -0.72306807 \times 10^{-4}$, $A8 = 0.17014805 \times 10^{-5}$,
$A10 = -0.18473122 \times 10^{-7}$ Aspherical Surface Data of Surface r6

$\epsilon = 1.0000$, $A4 = 0.17248932 \times 10^{-2}$,
$A6 = -0.67033494 \times 10^{-4}$, $A8 = 0.14953168 \times 10^{-5}$,
$A10 = -0.15314923 \times 10^{-7}$ Aspherical Surface Data of Surface r12

$\epsilon = 1.0000$, $A4 = 0.12962356 \times 10^{-3}$,
$A6 = -0.64502263 \times 10^{-6}$, $A8 = 0.57374965 \times 10^{-7}$ Aspherical Surface Data of Surface r22

$\epsilon = 1.0000$, $A4 = 0.14398755 \times 10^{-2}$,
$A6 = -0.34876040 \times 10^{-3}$, $A8 = 0.39600244 \times 10^{-4}$,
$A10 = -0.18945983 \times 10^{-5}$ Aspherical Surface Data of Surface r23

$\epsilon = 1.0000$, $A4 = 0.31105119 \times 10^{-2}$,
$A6 = -0.10368421 \times 10^{-3}$, $A8 = 0.92555931 \times 10^{-5}$

TABLE 5

Example 5
f = 4.70~8.93~18.10
FNO = 2.80~3.70~4.70

| Radius of Curvature | Axial Distance | Refractive Index | Abbe Number |
|---|---|---|---|
| (Gr1) | | | |
| r1 = 32.033 | d1 = 0.900 | N1 = 1.85000 | ν1 = 40.04 |
| r2 = 9.233 | d2 = 2.500 | | |
| r3 = ∞ | d3 = 9.700 | | |
| r4 = ∞ | d4 = 1.272~2.425~1.200 | | |
| (Gr2) | | | |
| r5* = −65.417 | d5 = 1.100 | N2 = 1.52200 | ν2 = 52.20 |
| r6* = 9.765 | d6 = 1.053 | | |
| r7 = 11.793 | d7 = 1.500 | N3 = 1.80518 | ν3 = 25.43 |
| r8 = 38.129 | d8 = 17.792~6.354~0.891 | | |
| (Gr3) | | | |
| r9 = 147.242 | d9 = 2.004 | N4 = 1.67000 | ν4 = 57.07 |
| r10 = −10.505 | d10 = 0.010 | N5 = 1.51400 | ν5 = 42.83 |
| r11 = −10.505 | d11 = 0.800 | N6 = 1.84666 | ν6 = 23.82 |
| r12 = −18.332 | d12 = 0.500~5.652~0.500 | | |
| (ST) | | | |
| r13 = ∞ | d13 = 0.722 | | |
| (Gr4) | | | |
| r14 = 7.371 | d14 = 2.439 | N7 = 1.51823 | ν7 = 58.96 |
| r15 = 19.562 | d15 = 1.250 | | |
| r16 = 9.050 | d16 = 4.900 | N8 = 1.63980 | ν8 = 34.55 |
| r17 = −6.010 | d17 = 0.010 | N9 = 1.51400 | ν9 = 42.83 |
| r18 = −6.010 | d18 = 1.200 | N10 = 1.80358 | ν10 = 25.38 |
| r19* = 5.137 | d19 = 2.392~7.526~19.365 | | |
| (Gr5) | | | |
| r20* = −18.506 | d20 = 2.000 | N11 = 1.52200 | ν11 = 52.20 |
| r21* = −5.511 | d21 = 0.600 | | |
| (PL) | | | |
| r22 = ∞ | d22 = 1.667 | N12 = 1.51680 | ν12 = 64.20 |
| r23 = ∞ | d23 = 0.500 | | |
| r24 = ∞ | d24 = 0.800 | N13 = 1.51680 | ν13 = 64.20 |
| r25 = ∞ | | | |

Aspherical Surface Data of Surface r5

$\epsilon = 1.0000$, $A4 = 0.64563886 \times 10^{-3}$,
$A6 = -0.25558214 \times 10^{-4}$, $A8 = 0.59377128 \times 10^{-6}$,
$A10 = -0.61695977 \times 10^{-8}$ Aspherical Surface Data of Surface r6

$\epsilon = 1.0000$, $A4 = 0.56044458 \times 10^{-3}$,
$A6 = -0.25343628 \times 10^{-4}$, $A8 = 0.49999600 \times 10^{-6}$,
$A10 = -0.43643694 \times 10^{-8}$ Aspherical Surface Data of Surface r19

$\epsilon = 1.0000$, $A4 = 0.90531135 \times 10^{-3}$,
$A6 = 0.55915513 \times 10^{-4}$, $A8 = -0.94268236 \times 10^{-6}$ Aspherical Surface Data of Surface r20

$\epsilon = 1.0000$, $A4 = -0.65479574 \times 10^{-3}$,
$A6 = 0.14758923 \times 10^{-3}$, $A8 = -0.10576555 \times 10^{-4}$,
$A10 = 0.11273233 \times 10^{-6}$ Aspherical Surface Data of Surface r21

$\epsilon = 1.0000$, $A4 = 0.12239465 \times 10^{-2}$,
$A6 = 0.68628623 \times 10^{-4}$, $A8 = -0.44116659 \times 10^{-5}$

TABLE 6

Example 6
f = 4.70~8.93~13.63
FNO = 2.80~3.60~4.60

| Radius of Curvature | Axial Distance | Refractive Index | Abbe Number |
|---|---|---|---|
| (Gr1) | | | |
| r1 = 30.317 | d1 = 0.900 | N1 = 1.85000 | ν1 = 40.04 |
| r2 = 9.248 | d2 = 2.500 | | |
| r3 = ∞ | d3 = 9.500 | | |
| r4 = ∞ | d4 = 1.000~1.550~1.000 | | |
| (Gr2) | | | |
| r5* = 89.104 | d5 = 1.100 | N2 = 1.52200 | ν2 = 52.20 |
| r6* = 7.292 | d6 = 1.090 | | |
| r7 = 8.688 | d7 = 1.500 | N3 = 1.80518 | ν3 = 25.43 |
| r8 = 17.828 | d8 = 13.974~4.376~0.945 | | |
| (Gr3) | | | |
| r9 = 57.157 | d9 = 2.152 | N4 = 1.69350 | ν4 = 50.29 |
| r10 = −8.089 | d10 = 0.010 | N5 = 1.51400 | ν5 = 42.83 |
| r11 = −8.089 | d11 = 0.800 | N6 = 1.84666 | ν6 = 23.82 |
| r12 = −15.704 | d12 = 0.500~5.073~2.603 | | |
| (ST) | | | |
| r13 = ∞ | d13 = 1.007 | | |
| (Gr4) | | | |
| r14 = 6.736 | d14 = 6.200 | N7 = 1.75450 | ν7 = 32.83 |
| r15 = −5.747 | d15 = 0.010 | N8 = 1.51400 | ν8 = 42.83 |
| r16 = −5.747 | d16 = 1.058 | N9 = 1.84666 | ν9 = 23.82 |
| r17 = 3.969 | d17 = 1.000 | | |
| r18* = 5.495 | d18 = 1.300 | N10 = 1.52200 | ν10 = 52.20 |
| r19* = 9.536 | d19 = 1.143~5.618~12.069 | | |
| (Gr5) | | | |
| r20* = −20.361 | d20 = 2.000 | N11 = 1.52200 | ν11 = 52.20 |
| r21* = −5.452 | d21 = 0.600 | | |
| (PL) | | | |
| r22 = ∞ | d22 = 1.667 | N12 = 1.51680 | ν12 = 64.20 |
| r23 = ∞ | d23 = 0.500 | | |
| r24 = ∞ | d24 = 0.800 | N13 = 1.51680 | ν13 = 64.20 |
| r25 = ∞ | | | |

Aspherical Surface Data of Surface r5

$\epsilon = 1.0000$, $A4 = 0.87396872 \times 10^{-3}$,
$A6 = -0.30397334 \times 10^{-4}$, $A8 = 0.74909239 \times 10^{-6}$,
$A10 = -0.71781784 \times 10^{-8}$ Aspherical Surface Data of Surface r6

$\epsilon = 1.0000$, $A4 = 0.82198127 \times 10^{-3}$,
$A6 = -0.33486093 \times 10^{-4}$, $A8 = 0.74661790 \times 10^{-6}$,
$A10 = -0.77317664 \times 10^{-8}$ Aspherical Surface Data of Surface r18

$\epsilon = 1.0000$, $A4 = -0.57027267 \times 10^{-4}$,
$A6 = -0.15173011 \times 10^{-3}$, $A8 = -0.85190287 \times 10^{-5}$ Aspherical Surface Data of Surface r19

$\epsilon = 1.0000$, $A4 = 0.80317196 \times 10^{-3}$,
$A6 = -0.11792837 \times 10^{-3}$, $A8 = -0.12597351 \times 10^{-4}$ Aspherical Surface Data of Surface r20

$\epsilon = 1.0000$, $A4 = -0.22043670 \times 10^{-2}$,
$A6 = 0.23264595 \times 10^{-3}$, $A8 = -0.12158021 \times 10^{-4}$,
$A10 = 0.12029400 \times 10^{-6}$ Aspherical Surface Data of Surface r21

$\epsilon = 1.0000$, $A4 = -0.44995495 \times 10^{-3}$,
$A6 = 0.16400088 \times 10^{-3}$, $A8 = -0.58139874 \times 10^{-5}$

TABLE 7

Example 7
f = 3.80~7.22~11.02
FNO = 2.80~3.68~4.30

| Radius of Curvature | Axial Distance | Refractive Index | Abbe Number |
|---|---|---|---|
| (Gr1) | | | |
| r1 = 52.097 | d1 = 0.900 | N1 = 1.85000 | ν1 = 40.04 |
| r2 = 12.254 | d2 = 2.500 | | |
| r3 = ∞ | d3 = 9.400 | N2 = 1.84666 | ν2 = 23.82 |
| r4 = ∞ | d4 = 1.302~2.345~1.200 | | |
| (Gr2) | | | |
| r5* = −38.002 | d5 = 1.400 | N3 = 1.52200 | ν3 = 52.20 |
| r6* = 6.643 | d6 = 1.800 | | |
| r7 = 10.201 | d7 = 2.009 | N4 = 1.67339 | ν4 = 29.25 |
| r8 = 203.867 | d8 = 17.613~5.105~0.756 | | |
| (Gr3) | | | |
| r9 = 43.330 | d9 = 1.782 | N5 = 1.62280 | ν5 = 56.88 |
| r10 = −10.110 | d10 = 1.500 | N6 = 1.84666 | ν6 = 23.82 |
| r11 = −17.478 | d11 = 0.500~8.035~7.834 | | |
| (ST) | | | |
| r12 = ∞ | d12 = 0.730 | | |
| (Gr4) | | | |
| r13 = 5.497 | d13 = 1.883 | N7 = 1.58144 | ν7 = 40.89 |
| r14 = 46.771 | d14 = 0.373 | | |
| r15 = 15.807 | d15 = 2.400 | N8 = 1.71736 | ν8 = 29.42 |
| r16 = −5.965 | d16 = 0.010 | N9 = 1.51400 | ν9 = 42.83 |
| r17 = −5.965 | d17 = 1.200 | N10 = 1.84506 | ν10 = 23.66 |
| r18* = 4.850 | d18 = 2.224~6.154~11.849 | | |
| (Gr5) | | | |
| r19* = −4863.577 | d19 = 2.430 | N11 = 1.52200 | ν11 = 52.20 |
| r20* = −5.589 | d20 = 0.600 | | |
| (PL) | | | |
| r21 = ∞ | d21 = 1.667 | N12 = 1.51680 | ν12 = 64.20 |
| r22 = ∞ | d22 = 0.556 | | |
| r23 = ∞ | d23 = 0.833 | N13 = 1.51680 | ν13 = 64.20 |
| r24 = ∞ | | | |

Aspherical Surface Data of Surface r5

$\epsilon = 1.0000$, $A4 = 0.90321155 \times 10^{-3}$,
$A6 = -0.32868934 \times 10^{-4}$, $A8 = 0.81046767 \times 10^{-6}$,
$A10 = -0.95744135 \times 10^{-8}$ Aspherical Surface Data of Surface r6

$\epsilon = 1.0000$, $A4 = 0.62734987 \times 10^{-3}$,
$A6 = -0.40992204 \times 10^{-4}$, $A8 = 0.10153820 \times 10^{-5}$,
$A10 = -0.19962695 \times 10^{-7}$ Aspherical Surface Data of Surface r18

$\epsilon = 1.0000$, $A4 = 0.14206040 \times 10^{-2}$,
$A6 = 0.10547883 \times 10^{-3}$, $A8 = 0.27427281 \times 10^{-5}$ Aspherical Surface Data of Surface r19

$\epsilon = 1.0000$, $A4 = -0.89207427 \times 10^{-3}$,
$A6 = 0.68444545 \times 10^{-5}$, $A8 = -0.52772806 \times 10^{-5}$,
$A10 = 0.47336185 \times 10^{-7}$ Aspherical Surface Data of Surface r20

$\epsilon = 1.0000$, $A4 = 0.10320751 \times 10^{-2}$,
$A6 = -0.36561311 \times 10^{-4}$, $A8 = -0.10818467 \times 10^{-5}$

TABLE 8

| | (1) $|f1/fW|$ | (2), (2a) $|f12/fW|$ |
|---|---|---|
| Example 1 | 2.850 | 2.521 |
| Example 2 | 3.287 | 2.820 |
| Example 3 | 3.323 | 2.572 |
| Example 4 | 3.552 | 2.353 |
| Example 5 | 3.307 | 2.569 |
| Example 6 | 3.398 | 2.456 |
| Example 7 | 5.013 | 3.495 |

What is claimed is:

1. A taking lens apparatus comprising:
a zoom lens system that is composed of a plurality of lens units and that achieves zooming by varying distances between the lens units; and
an image sensor that converts an optical image formed by the zoom lens system into an electrical signal;
the zoom lens system comprising, from an object side:
a first lens unit disposed on a most object side and having a negative optical power;
a second lens unit disposed on an image side of the first lens unit and having a negative optical power;
a third lens unit disposed on an image side of the second lens unit and having a positive optical power;
a fourth lens unit disposed on an image side of the third lens unit and having a positive optical power; and
a fifth lens unit disposed on an image side of the fourth lens unit and having a positive optical power,
wherein, during zooming, the lens or lenses comprising each lens unit move or remain stationary as a unit, and
wherein, during zooming, the first lens unit remains stationary relative to the image sensor, and the second and third lens units move.

2. A taking lens apparatus as claimed in claim 1, wherein the first lens unit includes a reflective surface that bends an optical path substantially at 90°.

3. A taking lens apparatus as claimed in claim 2, wherein the following condition is fulfilled:

$$2<|f1/fW|<6$$

where
f1 represents a focal length of a lens group located on an object side of the reflective surface; and
fW represents a focal length of the zoom lens system as a whole at a wide-angle end.

4. A taking lens apparatus as claimed in claim 1, wherein the following condition is fulfilled:

$$2<|f12/fW|<5$$

where
f12 represents a composite focal length of the first and second lens units at a wide-angle end; and
fW represents a focal length of the zoom lens system as a whole at the wide-angle end.

5. A taking lens apparatus as claimed in claim 1, wherein the first lens unit consists of a negative lens element and a reflective surface.

6. A taking lens apparatus as claimed in claim 1, wherein, during zooming, the fifth lens unit remains stationary relative to the image sensor.

7. A taking lens apparatus as claimed in claim 1, wherein, during zooming from a wide-angle end to a telephoto end, the fifth lens unit moves toward an image side.

8. A taking lens apparatus as claimed in claim 1,
wherein, during zooming from a wide-angle end to a telephoto end, the second lens unit moves along a U-shaped trajectory convex to an image side.

9. A taking lens apparatus as claimed in claim 1,
wherein, during zooming from a wide-angle end to a telephoto end, the second lens unit moves toward an object side.

10. A taking lens apparatus as claimed in claim 1, further comprising:
an aperture stop disposed on an image side of the third lens unit.

11. A taking lens apparatus as claimed in claim 1, further comprising:
an aperture stop disposed between the third and fourth lens units.

12. A taking lens apparatus comprising:
a zoom lens system that is composed of a plurality of lens units and that achieves zooming by varying distances between the lens units; and
an image sensor that converts an optical image formed by the zoom lens system into an electrical signal;
the zoom lens system comprising, from an object side:
a first lens unit disposed on a most object side, having a negative optical power and including a reflective surface that bends an optical path substantially at 90°;
a second lens unit disposed on an image side of the first lens unit and having a negative optical power; and
a plurality of succeeding lens units disposed on the image side of the second lens unit, the plurality of succeeding lens units including at least two lens units having a positive optical power,
wherein, during zooming, the lens or lenses comprising each lens unit move or remain stationary as a unit.

13. A taking lens apparatus as claimed in claim 12,
wherein the following condition is fulfilled:

$$2<|f1/fW|<6$$

where
f1 represents a focal length of a lens group located on an object side of the reflective surface; and
fW represents a focal length of the zoom lens system as a whole at a wide-angle end.

14. A taking lens apparatus as claimed in claim 12,
wherein the following condition is fulfilled:

$$2<|f12/fW|<5$$

where
f12 represents a composite focal length of the first and second lens units at a wide-angle end; and
fW represents a focal length of the zoom lens system as a whole at the wide-angle end.

15. A taking lens apparatus as claimed in claim 12,
wherein the first lens unit consists of a negative lens element and the reflective surface.

16. A taking lens apparatus as claimed in claim 12,
wherein, during zooming from a wide-angle end to a telephoto end, the second lens unit moves along a U-shaped trajectory convex to an image side.

17. A taking lens apparatus as claimed in claim 12,
wherein, during zooming from a wide-angle end to a telephoto end, the second lens unit moves toward an object side.

18. A taking lens apparatus as claimed in claim 12, further comprising:
an aperture stop disposed between the two positive lens units.

19. A taking lens apparatus as claimed in claim 12,
wherein the succeeding lens units include a cemented lens element.

20. A digital camera comprising:
a taking lens apparatus as claimed in claim 1 or 12.

21. A cellular phone comprising:
a taking lens apparatus as claimed in claim 1 or 12.

* * * * *